(12) United States Patent
Kottapalli et al.

(10) Patent No.: US 9,746,356 B2
(45) Date of Patent: Aug. 29, 2017

(54) SENSOR, METHOD FOR FORMING THE SAME, AND METHOD OF CONTROLLING THE SAME

(71) Applicants: NANYANG TECHNOLOGICAL UNIVERSITY, Singapore (SG); MASSACHUSETTS INSTITUTE OF TECHNOLOGY, Cambridge, MA (US)

(72) Inventors: Ajay Giri Prakash Kottapalli, Singapore (SG); Jianmin Miao, Singapore (SG); Mohsen Asadniaye Fard Jahromi, Singapore (SG); Michael Triantafyllou, Cambridge, MA (US)

(73) Assignees: NANYANG TECHNOLOGICAL UNIVERSITY, Singapore (SG); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 118 days.

(21) Appl. No.: 14/758,661

(22) PCT Filed: Dec. 31, 2013

(86) PCT No.: PCT/SG2013/000560
§ 371 (c)(1),
(2) Date: Jun. 30, 2015

(87) PCT Pub. No.: WO2014/107139
PCT Pub. Date: Jul. 10, 2014

(65) Prior Publication Data
US 2015/0338253 A1    Nov. 26, 2015

Related U.S. Application Data

(60) Provisional application No. 61/748,184, filed on Jan. 2, 2013.

(51) Int. Cl.
*G01F 1/28* (2006.01)
*G01P 5/04* (2006.01)
(Continued)

(52) U.S. Cl.
CPC .............. *G01F 1/28* (2013.01); *G01L 9/0051* (2013.01); *G01P 5/04* (2013.01); *B33Y 10/00* (2014.12);
(Continued)

(58) Field of Classification Search
CPC ....................................................... G01F 1/28
(Continued)

(56) References Cited

U.S. PATENT DOCUMENTS 7,661,319 B2 * 2/2010 Liu ........................ B81B 3/0021
73/774
8,056,419 B2 11/2011 Liu et al.
(Continued)

OTHER PUBLICATIONS

Peleshanko, Sergiy, Hydrogel-Encapsulated Microfabricated Haircells Mimicking Fish Cupula Neuromast, Wiley-Vch DOI Advanced Materials, 2007, pp. 2903-2909.*
(Continued)

*Primary Examiner* — Clayton E Laballe
*Assistant Examiner* — Kevin Butler
(74) *Attorney, Agent, or Firm* — Hultquist, PLLC; Steven J. Hultquist

(57) ABSTRACT

According to embodiments of the present invention, a sensor for determining a flow parameter of a fluid is provided. The sensor includes a polymer membrane, an elongate microstructure extending from the polymer membrane, and a hydrogel coupled to at least a portion of the elongate microstructure, wherein the hydrogel and the elongate microstructure are arranged to cooperate to cause a displacement of the polymer membrane in response to a fluid flowing
(Continued)

and interacting with the sensor, and wherein the sensor is configured to provide a measurement indicative of a flow parameter of the fluid based on the displacement of the polymer membrane. According to further embodiments of the present invention, a method for forming a sensor and a method of controlling a sensor are also provided.

20 Claims, 15 Drawing Sheets

(51) Int. Cl.
 G01L 9/00 (2006.01)
 B33Y 10/00 (2015.01)
 G01P 13/00 (2006.01)
 G01F 1/24 (2006.01)
 G01F 1/20 (2006.01)
(52) U.S. Cl.
 CPC ............... G01F 1/206 (2013.01); G01F 1/24 (2013.01); G01P 13/0033 (2013.01)
(58) Field of Classification Search
 USPC ...................................................... 73/861.74
 See application file for complete search history.

(56) References Cited

U.S. PATENT DOCUMENTS

| | | | | |
|---|---|---|---|---|
| 8,431,080 | B2* | 4/2013 | Liu ................... | B01L 3/502707 257/417 |
| 2005/0021247 | A1* | 1/2005 | Liu ........................ | G01F 1/28 702/42 |
| 2008/0072682 | A1* | 3/2008 | Liu ........................ | G01F 1/28 73/756 |
| 2011/0192233 | A1* | 8/2011 | Aizenberg ............ | B29C 39/026 73/861 |
| 2012/0042715 | A1* | 2/2012 | Liu ........................ | G01F 1/00 73/54.01 |
| 2015/0338253 | A1* | 11/2015 | Kottapalli ............. | G01L 9/0051 73/861.74 |

OTHER PUBLICATIONS

Tao, Junliang, Hair flow sensors: from bio-inspiration to bio-mimicking-a review, OP Publishing Ltd,, 2012, pp. 1-23.*
PCT/SG2013/000560 Written Opinion of the International Searching Authority, Mar. 12, 2014, 4 pages.*
PCT/SG2013/000560 International Search Report, Jan. 2, 2013, 4 pages.*
A.G.P. Kottapalli et al, A Flexible Liquid Crystal Polymer MEMS Pressure Sensor Array for Fish-Like Underwater Sensing, Smart Materials and Structures, vol. 21, Oct. 2012, pp. 1-13.*
Aarthi et al, Development of MEMS based Pressure Sensor for Underwater Applications, Excerpt from the proceedings of the 2013 COMSOL Conference in Bangalore, 6 pgs.*
Preedipat, Sattayasoonthorn, LCP MEMS Implantable Pressure Sensor for Intracranial Pressure Measurement, 7th IEEE International Conference on Nano/Molecular Medicine and Engineering, Nov. 10-13, 2013, 5 pgs.*

Aiyar, A., "An all polymer air-flow sensor array using a piezoresistive composite elastomer", "MEMS 2009: IEEE 22nd International Conference on Micro Electro Mechanical Systems", Jan. 25-29, 2009, pp. 447-450.
Anderson, K., et al., "Hydrogel microstructures combined with electrospun fibers and photopatterning for shape and modulus control", "Polymer", Oct. 2, 2008, pp. 5284-5293, vol. 49.
Chen. J., et al., "Development of Polymer-Based Artificial Haircell Using Surface Micromachining and 3D Assembly", "Transducers '03: The 12th International Conference on Solid State Sensors, Actuators and Microsystems", Jun. 8-12, 2003, pp. 1035-1038, Published in: Boston, MA.
Chen, N., et al., "Design and Characterization of Artificial Haircell Sensor for Flow Sensing With Ultrahigh Velocity and Angular Sensitivity", "Journal of Microelectromechanical Systems", Oct. 2007, pp. 999-1014, vol. 16, No. 5.
Galante, T., et al., "Design, Modeling, and Performance of a High Force Piezoelectric Inchworm Motor", "Journal of Intelligent Material Systems and Structures", Dec. 1999, pp. 962-972, vol. 10.
Kottapalli, A., et al., "A liquid crystal polymer membrane MEMS sensor for flow rate and flow direction sensing applications", "J. Micromech. Microeng.", Jun. 27, 2011, pp. 1-11, vol. 21, No. 085006.
Kottapalli, A., et al., "A flexible liquid crystal polymer MEMS pressure sensor array for fish-like underwater sensing", "Smart Mater. Struct.", Oct. 23, 2012, pp. 1-13, vol. 21, No. 115030.
Lee, H., et al., "Mussel-Inspired Surface Chemistry for Multifunctional Coatings", "Science", Oct. 19, 2007, pp. 426-430, vol. 318.
Liu, C., "Micromachined biomimetic artificial haircell sensors", "Bioinsp. Biomim.", Oct. 16, 2007, pp. S162-S169, vol. 2.
Liu, C., et al., "Artificial Hair Cells for Sensing Flows", "NASA Tech Briefs", Jan. 2007, pp. 6-7.
Mahadevan, L., et al., "Biomimetic ratcheting motion of a soft, slender, sessile gel", "PNAS", Jan. 6, 2004, pp. 23-26, vol. 101, No. 1.
McConney, M., et al., "Bioinspired Material Approaches to Sensing", "Adv. Funct. Mater.", 2009, pp. 2527-2544, vol. 19.
Montgomery, J., et al., "Biology of the mechanosensory lateral line in fishes", "Reviews in Fish Biology and Fisheries", 1995, pp. 399-416, vol. 5.
Montgomery, J., et al., "The mechanosensory lateral line system of the hypogean form of Astyanax fasciatus", "Environmental Biology of Fishes", 2001, pp. 87-96, vol. 62.
Najafi, K., "Biomimetic Hair Sensors: Utilizing the Third Dimension", "Sensors 2012: IEEE", Oct. 28-31, 2012, pp. 14, Published in: Taipei, Taiwan.
Peleshanko, S., et al., "Hydrogel-Encapsulated Microfabricated Haircells Mimicking Fish Cupula Neuromast", "Adv. Mater", 2007, pp. 2903-2909, vol. 19.
Shimozawa, T., et al., "Structural scaling and functional design of the cercal wind-receptor hairs of cricket", "J Comp Physiol A", 1998, pp. 171-186, vol. 183.
Tao, J., et al., "Hair flow sensors: from bio-inspiration to bio-mimicking—a review", "Smart Mater. Struct.", Sep. 21, 2012, pp. 1-23, vol. 21, No. 113001.
NOTE: For the non-patent literature citations that no month of publication is indicated, the year of publication is more than 1 year prior to the effective filing date of the present application.

* cited by examiner

SENSOR, METHOD FOR FORMING THE SAME, AND METHOD OF CONTROLLING THE SAME

CROSS-REFERENCE TO RELATED APPLICATIONS

This application is a U.S. national phase under the provisions of 35 U.S.C. §371 of International Patent Application No. PCT/SG2013/000560 filed Dec. 31, 2013, which in turn claims the benefit of priority of U.S. Provisional Patent Application No. 61/748,184 filed Jan. 2, 2013. The disclosures of such international patent application and U.S. priority patent application are hereby incorporated herein by reference in their respective entireties, for all purposes.

TECHNICAL FIELD

Various embodiments relate to a sensor, a method for forming the sensor and a method of controlling the sensor.

BACKGROUND

Biological sensors found in nature have some of the best designs with incomprehensible features. Biomimetic sensor development involves learning various design features, sensing phenomenon, and material aspects from nature, and utilizing them to uniquely engineer or benefit man-made artificial sensors.

Knowledge obtained from the natural systems could significantly benefit the engineering of artificial devices. Bio-inspired studies try to look outside traditional domains into natural environmental processes to find key inspiration in order to result in novel designs for engineering systems. In the past, many researchers have shown substantial interest in developing bio-inspired systems, both in the macro- and micro-levels: for example piezoelectric inchworm motor inspired by the inchworms, flow sensors inspired by the cercal wind-receptor hair-like structures in crickets, materials capable of leg-less motion inspired by the locomotion of terrestrial limbless animals, mussel inspired adhesive materials, etc.

Blind cave fish are a unique fish species that are capable of swimming at high speeds in water without colliding with any underwater obstacles around them in spite of being blind. The blind cave fish accomplishes this surprising feat just by relying on arrays of flow and pressure-gradient sensors present on its body. An artificial analogue of similar arrays of flow and pressure sensors could greatly benefit underwater vehicles to visualize their surroundings and enable them to perform energy-efficient maneuvering. Individual biological sensors present on and under the skin of the blind cave fish are called neuromasts. These neuromasts consist of a gelatinous cupula with encapsulated cupular fibrils that support the soft cupular material that extends into the flow.

FIG. 1A shows a photograph 100 of a blind cave characin fish 102. In spite of being blind, the blind cave characin fish 102 displays an uncanny ability to swim at high speeds without collision with any underwater obstacles. It relies on two types of biological sensors present on and inside its skin to derive information about flows around its body called the superficial neuromasts and the canal neuromasts. In FIG. 1A, the dotted line 104 represents a lateral line of canal neuromasts on the body of the blind cave characin fish 102.

The canal neuromasts (CNs) are enclosed in fluid-filled canals present sub-dermally and are exposed to external water through pores in the skin of a blind cave characin fish. The body of the fish has more or less equally spaced CNs, each of which is located between two canal pores 112 on the over-enclosing canal as seen in the SEM images 110, 120 of FIGS. 1B and 1C.

The superficial neuromasts (SNs) are spatially distributed on the body of a blind cave characin fish and respond to the net movements between the fish and the surrounding water. Therefore, the SNs are responsible for flow velocity sensing and they respond slowly. FIG. 1D shows a schematic cross-sectional view of a superficial neuromast 130 of a blind cave characin fish, illustrating the sensing mechanism of the superficial neuromast 130. The morphology of individual superficial neuromasts 130 consists of bundles of haircells 132 encapsulated in a gelatinous cupula 134. External flow of water, as represented by 140, past the cupula 134 generates a frictional force on the cupula 134 causing the cupula 134 to bend and thereby the haircells 132 embedded inside the cupula 134 are stimulated. The cupular structure 134 acts as a mechanical coupler between surrounding water flow and the haircells 132 and increases the drag on the haircells 132 (or enhances the drag force exerted on the haircells 132) due to the increased surface area facing the flow. The cupula 134 consists of fibers called cupular fibrils 136 that extend from the base of the cupula 134 to its distal tip. The cupular fibrils 136 act as an internal structural support to the cupula 134, as a scaffold supporting the soft cupular material. The cupular fibrils 136 also allow the cupula 134 to grow much taller to reach beyond a boundary layer associated with the fish. The term "boundary layer" may refer to a layer of stationary or stagnant fluid in an immediate vicinity of a surface of the fish which may attenuate the velocity of fluid motion about the surface.

The canal neuromasts (CNs) are actuated only when there is a pressure difference between consecutive pores between those an individual CN is located in. The CNs therefore do not contribute to flow velocity sensing but perform acceleration sensing.

In the past, a few research groups worked towards developing a biomimetic hydrogel cupula to enhance the performance of a flow sensor. For example, flow sensors were developed with SU-8 hair-cells fabricated on thin silicon cantilever beams. A hydrogel cupula was formed by drop-casting polyethylene glycol (PEG) polymer on the SU-8 haircells. However, developing high-aspect ratio pillars by SU-8 processing is a very cumbersome process. There may also be issues related to the shape of very tall SU-8 pillars.

SUMMARY

According to an embodiment, a sensor for determining a flow parameter of a fluid is provided. The sensor may include a polymer membrane, an elongate microstructure extending from the polymer membrane, and a hydrogel coupled to at least a portion of the elongate microstructure, wherein the hydrogel and the elongate microstructure are arranged to cooperate to cause a displacement of the polymer membrane in response to a fluid flowing and interacting with the sensor, and wherein the sensor is configured to provide a measurement indicative of a flow parameter of the fluid based on the displacement of the polymer membrane.

According to an embodiment, a method for forming a sensor for determining a flow parameter of a fluid is provided. The method may include providing a polymer membrane, forming an elongate microstructure extending from the polymer membrane, and forming a hydrogel coupled to at least a portion of the elongate microstructure, wherein the hydrogel and the elongate microstructure are arranged to cooperate to cause a displacement of the polymer membrane in response to a fluid flowing and interacting with the sensor, and wherein the sensor is configured to provide a measurement indicative of a flow parameter of the fluid based on the displacement of the polymer membrane.

According to an embodiment, a method of controlling a sensor is provided. The method may include positioning a sensor in a flowing fluid, wherein an elongate microstructure extending from a polymer membrane of the sensor and a hydrogel coupled to at least a portion of the elongate microstructure cooperate to cause a displacement of the polymer membrane in response to the flowing fluid interacting with the sensor, and providing a measurement indicative of a flow parameter of the flowing fluid based on the displacement of the polymer membrane.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other method or device. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element includes a reference to one or more of the features or elements.

In the context of various embodiments, the phrase "at least substantially" may include "exactly" and a reasonable variance.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments may relate to a flexible pressure sensor array and airflow sensors. Further, various embodiments may relate to bio-inspired nanofibril encapsulated hydrogel cupulae for ultra-sensitive MEMS (Micro electro mechanical systems) flow sensor development.

Figure 1A:
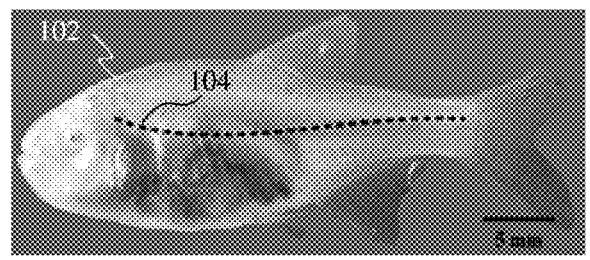
FIG. 1A shows a photograph of a blind cave characin fish.
Figure 1B:
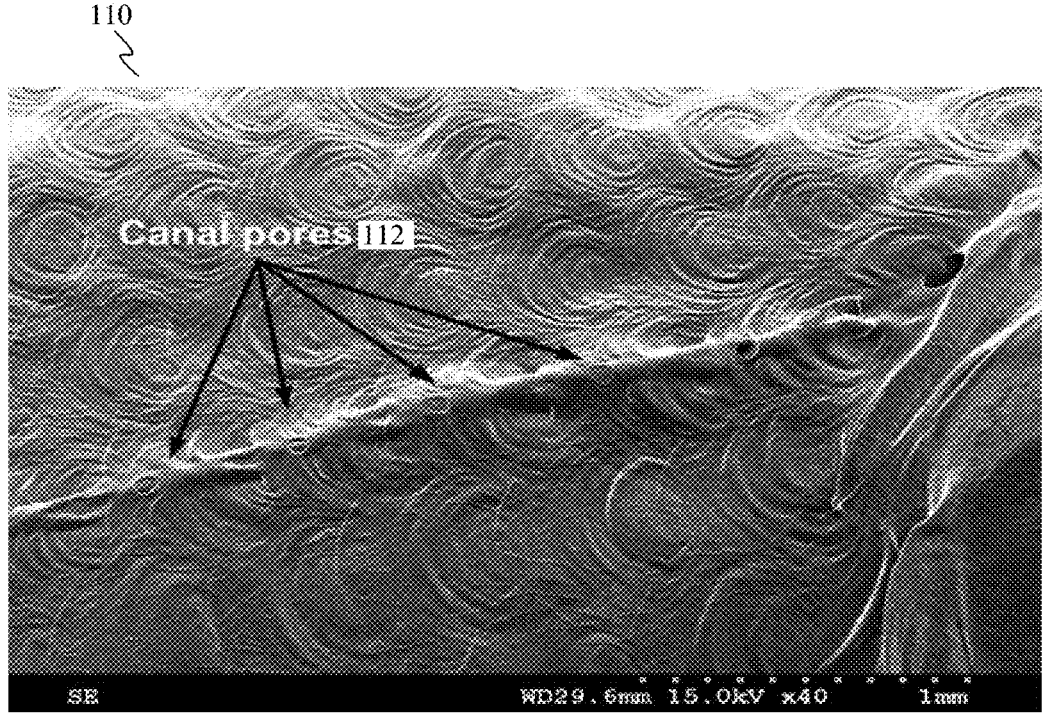
FIG. 1B shows a scanning electron microscope (SEM) image of a lateral-line showing a single row of canal neuromasts on the body of a blind cave characin fish.
Figure 1C:
FIG. 1C shows a scanning electron microscope (SEM) image of canal pores on various regions on a head of a blind cave characin fish.
Figure 1D:
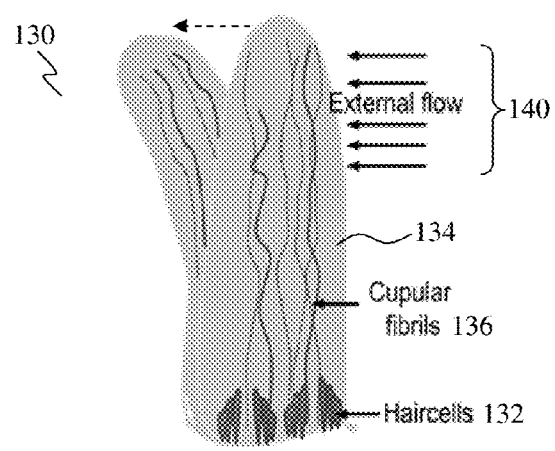
FIG. 1D shows a schematic cross-sectional view of a superficial neuromast of a blind cave characin fish.

Various embodiments may provide biomimetic microsensors using micro electro mechanical systems (MEMS) technology that may be capable of performing fish-like passive underwater sensing, utilizing materials and a sensing principle similar to the biological sensors on blind cave fish. The biomimetic sensors of various embodiments are inspired from the superficial neuromast sensors present on the body of the blind cave fish that respond to net movements between the fish and the surrounding water and act as flow sensors. As shown in FIG. 1D, each superficial neuromast 130 consists of a gelatinous cupula 134 that couples the surrounding flow to the encapsulated haircells 132. The cupula 134 enhances the signal transduction to the mechanosensing haircells 132 by imposing a higher drag force generated due to its larger surface area.

Various embodiments may provide for development of a sensor that wears on or employs a biomimetic cupula and which may perform flow sensing functionality similar to a biological cupula. Various embodiments may provide a MEMS sensor that may be functional in sensing flows in fluids.

Various embodiments may adopt design strategies involved in the biological flow sensors present on the body of the blind cave fish so as to engineer MEMS artificial flow sensors by employing micro/nano fabrication technologies. As non-limiting examples, the sensor or device may be fabricated from polymers. A high-aspect ratio haircell (e.g. an elongate microstructure) may be fabricated by employing stereolithographic sculpting of a Si60 material. Biomimetic cupular fibrils may be deposited by electrospinning a solution of PolyL-lactide/ϵ-caprolactone (PLC) to form nanofibrils. For example, the nanofibrils may be fabricated by using a solution of PolyL-lactide/ϵ-caprolactone (PLC):acetone in a 1:6 ratio. Pyramid-shaped nanofibrils formed around the haircell may act as a scaffold for drop-casting of a Hyaluronic acid-Methacrylic anhydride (HA-MA) hydrogel cupula. As an example, a hydrogel precursor solution of Hyaluronic acid-methacrylic anhydride (HA-MA) ($10^6$ Da) of approximately 1% concentration with approximately 0.1% I 2959 initiator may be used for the drop-casting process. The nanofibrils, similar to the cupular fibrils, may function as a structural support matrix for the cupula and may aid in coupling signal to the embedded haircell. Results obtained from testing the sensor of various embodiments in a wind tunnel and a water tunnel relating to its flow sensing performance show that the biomimetic cupula may enhance the sensitivity of the naked haircell sensor (without nanofibrils and cupula) by approximately 5 times and approximately 3.5 times for air flow sensing and water flow sensing respectively.

In the conventional approach, an SU-8 haircell was employed. However, developing high-aspect ratio pillars by SU-8 processing is a very cumbersome process. Also, fabrication of very tall SU-8 pillars is often associated with tapered side-walls leading to mushroom shaped pillars. It is important in flow sensor applications to develop tall yet robust pillars in order to ensure that the haircell extends beyond the stagnant boundary layer generated by flow. In various embodiments, high-aspect ratio haircells may be formed by employing stereolithography technology. In various embodiments, Si60 pillars of an aspect-ratio of approximately 7.25 may be defined. Further, various embodiments may provide a biomimetic polymer MEMS flow sensor that truly mimics the superficial neuromast sensors on the blind cave fish. The design also includes cupular fibrils that may support a gelatinous cupula, enabling drop-casting of a hydrogel on the haircell to form the cupula, without creeping onto a liquid crystal polymer (LCP) sensing membrane. In addition, the cupular fibrils may help in increasing the surface area of the cupula and may offer mechanical strength to the soft cupula to sustain the cupula in high velocity flows.

In various embodiments, the fabrication process may combine MEMS micro-fabrication techniques with wet chemistry approach which includes ultraviolet (UV) photo-polymerization to form the hydrogel cupula.

In various embodiments, the length of the elongate microstructure of the sensors of various embodiments may be higher than haircells employed in conventional sensors. In the design of various embodiments, the height of the elongate microstructure may be designed by considering the boundary layers generated by flow on the sensor structure. Taller elongate microstructures may be developed for sensors of various embodiments, which may extend beyond the boundary layers generated by the flow (for various air and water flow velocities which the sensors may be operable) and which may enhance the sensitivity of the flow sensors.

In various embodiments, drop-casting and addition of the hydrogel may be carried out so as to increase the surface area of the cupula, forming a prolate spheroid shaped hydrogel structure, which may enhance the sensitivity of the sensors. This may ensure that the steady-state flow velocities of fluid that the sensor structure may withstand may be far higher as compared to conventional sensors as the cupula in the sensors of various embodiments may be supported by an embedded haircell far until the distal tip of the cupula.

Figure 2A:
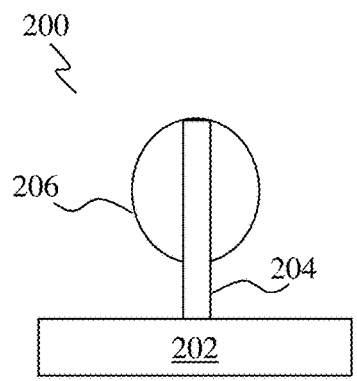
FIG. 2A shows a schematic cross-sectional view of a sensor for determining a flow parameter of a fluid, according to various embodiments.

FIG. 2A shows a schematic cross-sectional view of a sensor 200 for determining a flow parameter of a fluid, according to various embodiments. The sensor 200 includes a polymer membrane 202, an elongate microstructure 204 extending from the polymer membrane 202, a hydrogel 206 coupled to at least a portion of the elongate microstructure 204, wherein the hydrogel 206 and the elongate microstructure 204 are arranged to cooperate to cause a displacement of the polymer membrane 202 in response to a fluid flowing and interacting with the sensor 200, and wherein the sensor 200 is configured to provide a measurement indicative of a flow parameter of the fluid based on the displacement of the polymer membrane 202.

In other words, a sensor 200 may be provided. The sensor 200 may have a membrane 202 that may include a polymer. The membrane 202 may act as a sensing membrane. The sensor 200 may further include an elongate microstructure (e.g. a pillar) 204 extending from the polymer membrane 202, for example extending from a surface of the polymer membrane 202. The elongate microstructure 204 may act as a haircell. The sensor 200 may further include a hydrogel 206 on at least a portion of the elongate microstructure 204. The hydrogel 206 may act as a cupula. In various embodiments, when a flowing fluid interacts with the sensor 200, the hydrogel 206 and the elongate microstructure 204 may cooperate to cause a displacement of the polymer membrane 202. The flowing fluid may interact with at least one of the hydrogel 206 or the elongate microstructure 204. Based on the displacement of the polymer membrane 202, the sensor 200 may provide a measurement indicative of a flow parameter of the fluid.

In the context of various embodiments, the flow parameter may include a flow velocity of the fluid. At least one of a magnitude or a direction of the flow of the fluid may be determined.

In the context of various embodiments, the elongate microstructure 204 may include a stereolithographically defined elongate microstructure.

In various embodiments, the hydrogel 206 may at least substantially surround the portion of the elongate microstructure 204.

In various embodiments, the sensor 200 may further include a plurality of nanofibers at least substantially encapsulated by the hydrogel 206. The plurality of nanofibers may act as a support matrix or a scaffold for the hydrogel 206. The nanofibers may act as nanofibrils. The plurality of nanofibers may be coupled to the portion of the elongate microstructure 204. In various embodiments, the hydrogel 206 may have a ball-like structure or shape.

In various embodiments, the sensor 200 may further include at least one sensing element configured to provide the measurement indicative of the flow parameter of the fluid. The at least one sensing element may be coupled to the polymer membrane 202. The at least one sensing element may be formed or defined (e.g. by lithography and patterning) on the polymer membrane 202.

In various embodiments, the sensor 200 may further include a carrier coupled to the polymer membrane 202. The carrier may include at least one of silicon (Si) or a polymer, e.g. a liquid crystal polymer (LCP).

Figure 2B:
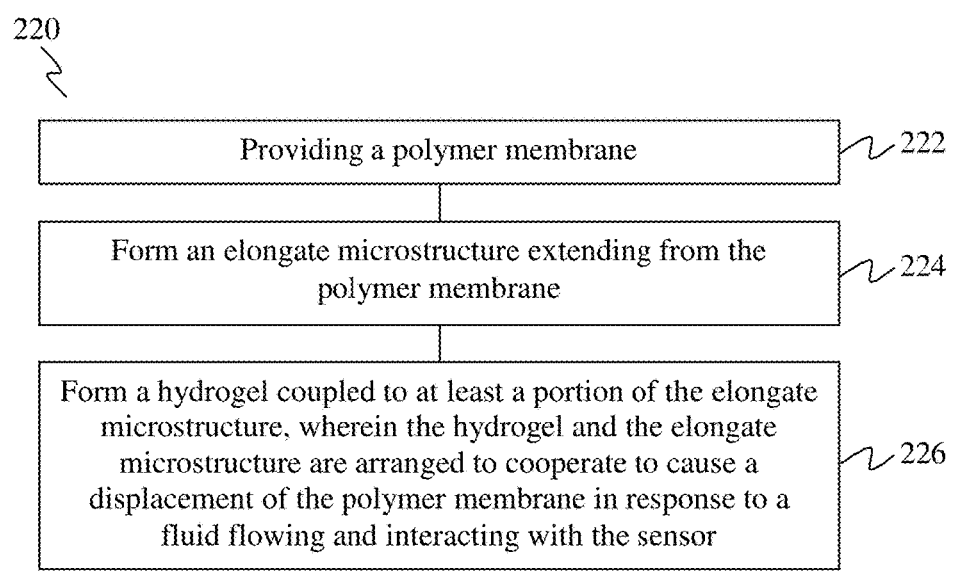
FIG. 2B shows a flow chart illustrating a method for forming a sensor for determining a flow parameter of a fluid, according to various embodiments.

FIG. 2B shows a flow chart 220 illustrating a method for forming a sensor for determining a flow parameter of a fluid, according to various embodiments.

At 222, a polymer membrane is provided.

At 224, an elongate microstructure is formed extending from the polymer membrane.

At 226, a hydrogel is formed coupled to at least a portion of the elongate microstructure, wherein the hydrogel and the elongate microstructure are arranged to cooperate to cause a displacement of the polymer membrane in response to a fluid flowing and interacting with the sensor.

In various embodiments, the sensor is configured to provide a measurement indicative of a flow parameter of the fluid based on the displacement of the polymer membrane.

In various embodiments, at 224, the elongate microstructure may be stereolithographically defined.

In various embodiments, at 226, the hydrogel may be formed to at least substantially surround the portion of the elongate microstructure.

In various embodiments, at 226, a hydrogel precursor solution may be drop-casted onto the elongate microstructure to form a gel-like material on the portion of the elongate microstructure, and the gel-like material may be converted into the hydrogel. In various embodiments, for converting the gel-like material into the hydrogel, the gel-like material may be subjected to an optical (e.g. ultraviolet, UV) stimulus, and thereafter, the gel-like material may be wetted to form the hydrogel. By undergoing wetting, the gel-like material may swell as water is absorbed into the gel-like material to form the hydrogel.

In various embodiments, the method may further include forming a plurality of nanofibers, wherein the hydrogel may be formed at least substantially encapsulating the plurality of nanofibers. This may mean that the hydrogel may completely encapsulate the plurality of nanofibers. In various embodiments, for forming the plurality of nanofibers, a spinning solution may be deposited onto the elongate microstructure by means of electrospinning, where the spinning solution includes a material constituting the plurality of nanofibers. The plurality of nanofibers may form a pyramidal shape extending from a tip of the elongate microstructure in a direction towards the polymer membrane. In this way, a pyramid-shaped nanofiber scaffold may be formed. In various embodiments, the pyramid-shaped structure of the electrospun nanofibers (nanofibrils) may act as a scaffold for a hydrogel (cupula) drop-casting process. In various embodiments, the electrospinning process may be performed in the absence of a focusing element (e.g. a focusing ring) that may focus and/or re-direct the spinning solution towards the elongate microstructure.

In various embodiments, the plurality of nanofibers may be formed prior to forming the hydrogel. After forming the plurality of nanofibers, a hydrogel precursor solution may be drop-casted onto the plurality of nanofibers. In this way, the plurality of nanofibers may act as a scaffold, guiding the drop-casting process. The plurality of nanofibers may be in the form of a pyramidal-shaped structure or scaffold.

In various embodiments, the method may further include forming at least one sensing element configured to provide the measurement indicative of the flow parameter of the fluid. The at least one sensing element may be formed by means of a lithography process.

In various embodiments, the method may further include coupling a carrier to the polymer membrane.

Figure 2C:
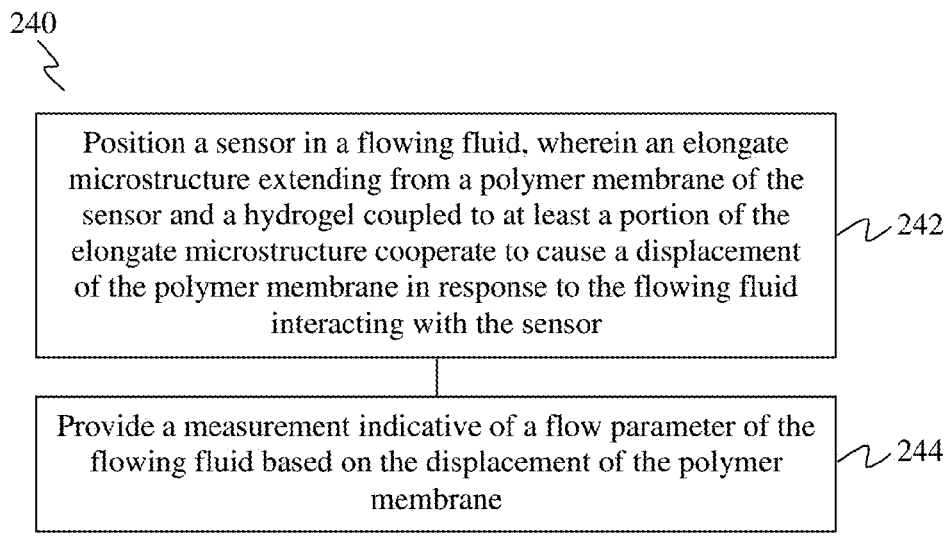
FIG. 2C shows a flow chart illustrating a method of controlling a sensor, according to various embodiments.

FIG. 2C shows a flow chart 240 illustrating a method of controlling a sensor, according to various embodiments.

At 242, a sensor is positioned in a flowing fluid, wherein an elongate microstructure extending from a polymer membrane of the sensor and a hydrogel coupled to at least a portion of the elongate microstructure cooperate to cause a displacement of the polymer membrane in response to the flowing fluid interacting with the sensor.

At 244, a measurement indicative of a flow parameter of the flowing fluid is provided based on the displacement of the polymer membrane.

In various embodiments, the measurement may include a change in a resistance associated with the sensor.

In various embodiments, the flow parameter may include a flow velocity of the flowing fluid. For example, at least one of a magnitude or a direction of the flow of the fluid may be determined.

While the methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

In the context of various embodiments, the at least one sensing element may include a strain gauge. The strain gauge may include a serpentine (or meander) shape arranged at least substantially surrounding the elongate microstructure (e.g. 204), for example surrounding a base of the elongate microstructure. The serpentine shape may be defined by a plurality of first elements extending radially from the elongate microstructure, and a plurality of second elements, wherein a respective second element of the plurality of second elements may be arranged in between adjacent or neighbouring first elements of the plurality of first elements. The first elements may be radial elements, while the second elements may be tangential elements. The first and second elements may define resistor or resistive elements. Each first element may have a length that is larger than a length of each second element. In this way, each first element may have a higher associated resistance than each second element. Each first element may have a width that is smaller than a width of each second element. In this way, each first element may have a higher associated resistance than each second element.

In the context of various embodiments, the strain gauge may be a single structure.

In the context of various embodiments, the strain gauge may include a metal, e.g. including but not limited to gold (Au), nickel (Ni), nickel-chromium (NiCr), aluminium (Al), or platinum (Pt).

In the context of various embodiments, the strain gauge may have a thickness of between about 50 nanometers (nm) and about 150 nanometers (nm), for example between about 50 nm and about 100 nm, between about 100 nm and about 150 nm, or between about 80 nm and about 120 nm.

In the context of various embodiments, the strain gauge may change its resistance in response to the displacement of the polymer membrane (e.g. 202). In this way, the strain gauge may act as a piezoresistor. The change in the resistance may be read out as a voltage change by a circuit. For example, the circuit may include a Wheatstone bridge circuit. In various embodiments, the circuit may be external to the sensor (e.g. 200).

In the context of various embodiments, the polymer membrane (e.g. 202) may have a thickness of between about 10 micrometers (μm) and about 150 micrometers (μm), for example between about 10 μm and about 100 μm, between about 10 μm and about 50 μm, between about 50 μm and about 150 μm, between about 100 μm and about 150 μm, or between about 40 μm and about 80 μm.

In the context of various embodiments, the polymer membrane (e.g. 202) may have a Young's modulus of between about 1 GPa and about 3 GPa, for example between about 1 GPa and about 2 GPa, or between about 2 GPa and about 3 GPa.

In the context of various embodiments, the polymer membrane (e.g. 202) may include a liquid crystal polymer (LCP).

In the context of various embodiments, the polymer membrane (e.g. 202) may be free of the hydrogel (e.g. 206).

In the context of various embodiments, the elongate microstructure (e.g. 204) may extend at least substantially perpendicular from a surface of the polymer membrane (e.g. 202).

In the context of various embodiments, the elongate microstructure (e.g. 204) may at least substantially contact the polymer membrane (e.g. 202).

In the context of various embodiments, the elongate microstructure (e.g. 204) may have a cylindrical structure.

In the context of various embodiments, the elongate microstructure (e.g. 204) may be arranged at the center of the polymer membrane (e.g. 202).

In the context of various embodiments, the elongate microstructure (e.g. 204) may include a polymer, e.g. Si60 polymer.

In the context of various embodiments, the elongate microstructure (e.g. 204) may have an aspect ratio of between about 6 and about 10, for example between about 6 and about 8, or between about 8 and about 10.

In the context of various embodiments, the elongate microstructure (e.g. 204) may have a length of between about 2.5 millimeters (mm) (i.e. 2500 μm) and about 4 millimeters (mm) (i.e. 4000 μm), for example between about 2500 μm and about 3500 μm, between about 3000 μm and about 4000 μm, or between about 2800 μm and about 3200 μm.

In the context of various embodiments, the elongate microstructure (e.g. 204) may have a width or diameter of between about 250 micrometers and about 400 micrometers, for example between about 250 μm and about 350 μm, between about 300 μm and about 400 μm, or between about 280 μm and about 320 μm.

In the context of various embodiments, the elongate microstructure (e.g. 204) may have a Young's modulus of between about 2 GPa and about 5 GPa, for example between about 2 GPa and about 3 GPa, between about 3 GPa and about 5 GPa, or between about 2.5 GPa and about 3.5 GPa.

In the context of various embodiments, the hydrogel (e.g. 206) may include hyaluronic acid, e.g. Hyaluronic acid-Methacrylic anhydride (HA-MA).

In the context of various embodiments, each nanofiber of the plurality of nanofibers may include caprolactone (e.g. PolyL-lactide/ε-caprolactone (PLC)), or polyvinylidene fluoride (PVDF), or lead zirconate titanate (PZT) (e.g. $Pb(Zr_{0.52}Ti_{0.48})O_3$).

In the context of various embodiments, each nanofiber of the plurality of nanofibers may have a diameter of between about 500 nm and about 1000 nm, for example between about 500 nm and about 800 nm, between about 500 nm and about 600 nm, between about 700 nm and about 1000 nm, or between about 600 nm and about 800 nm.

In the context of various embodiments, the sensor (e.g. 200) may be a flow sensor.

In the context of various embodiments, the term "fluid" may refer to at least one of air, gas or water.

In the context of various embodiments, the measurement indicative of the flow parameter of the fluid or flowing fluid may include a change in a resistance associated with the sensor. In the context of various embodiments, the measurement may include a change in a voltage associated with the sensor. The change in the voltage may be a result of a change in a resistance associated with the sensor. For example, a change in a resistance associated with the sensor may be read out as a change in voltage, for example by means of a circuit (e.g. a Wheatstone bridge circuit). As non-limiting examples, for 1 $ms^{-1}$ air flow, the measurement may include a voltage change of between about 1.2 mV and about 8 mV (i.e. sensitivity of between about 1.2 $mV/ms^{-1}$ and about 8 $mV/ms^{-1}$), for example between about 1.2 mV and about 6 mV, between about 1.2 mV and about 4 mV, or between about 3 mV and about 6 mV. For 1 $ms^{-1}$ water flow, the measurement may include a voltage change of between about 0.03 V and about 0.12 V (i.e. sensitivity of between about 0.03 $V/ms^{-1}$ and about 0.12 $V/ms^{-1}$), for example between about 0.03 V and about 0.08 V, between about 0.05 V and about 0.12 V, or between about 0.05 V and about 0.1 V.

Further, various embodiments may provide a sensor for determining a flow parameter of a fluid. The sensor may include a polymer membrane (e.g. a liquid crystal polymer (LCP) membrane), and an elongate microstructure extending from the polymer membrane, wherein the elongate microstructure is arranged to cause a displacement of the polymer membrane in response to a fluid flowing and interacting with the sensor, and wherein the sensor is configured to provide a measurement indicative of a flow parameter of the fluid based on the displacement of the polymer membrane. In this way, a naked haircell sensor may be provided. The sensor may be as described in the context of the sensor 200 (FIG. 2A), for example in terms of materials and/or parameters related to a feature, and/or additional features or elements.

The sensor structure and design of the sensors of various embodiments will now be described by way of the following non-limiting example with reference to FIGS. 3A and 3B.

Figure 3A:
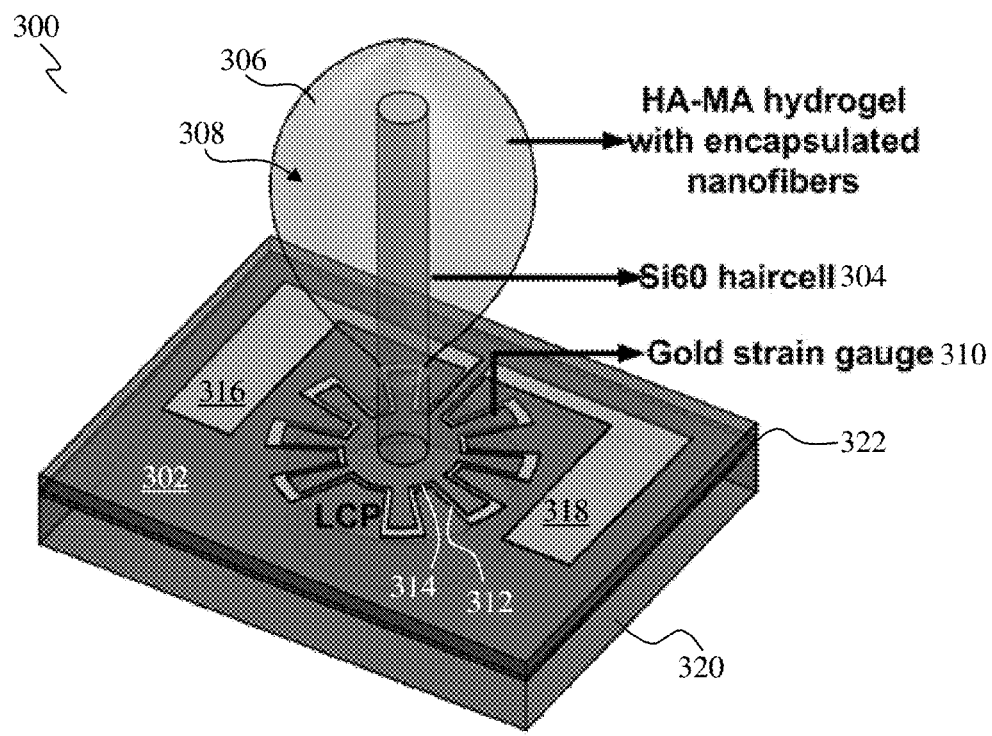
FIG. 3A shows a perspective view of a sensor, according to various embodiments.
Figure 3B:
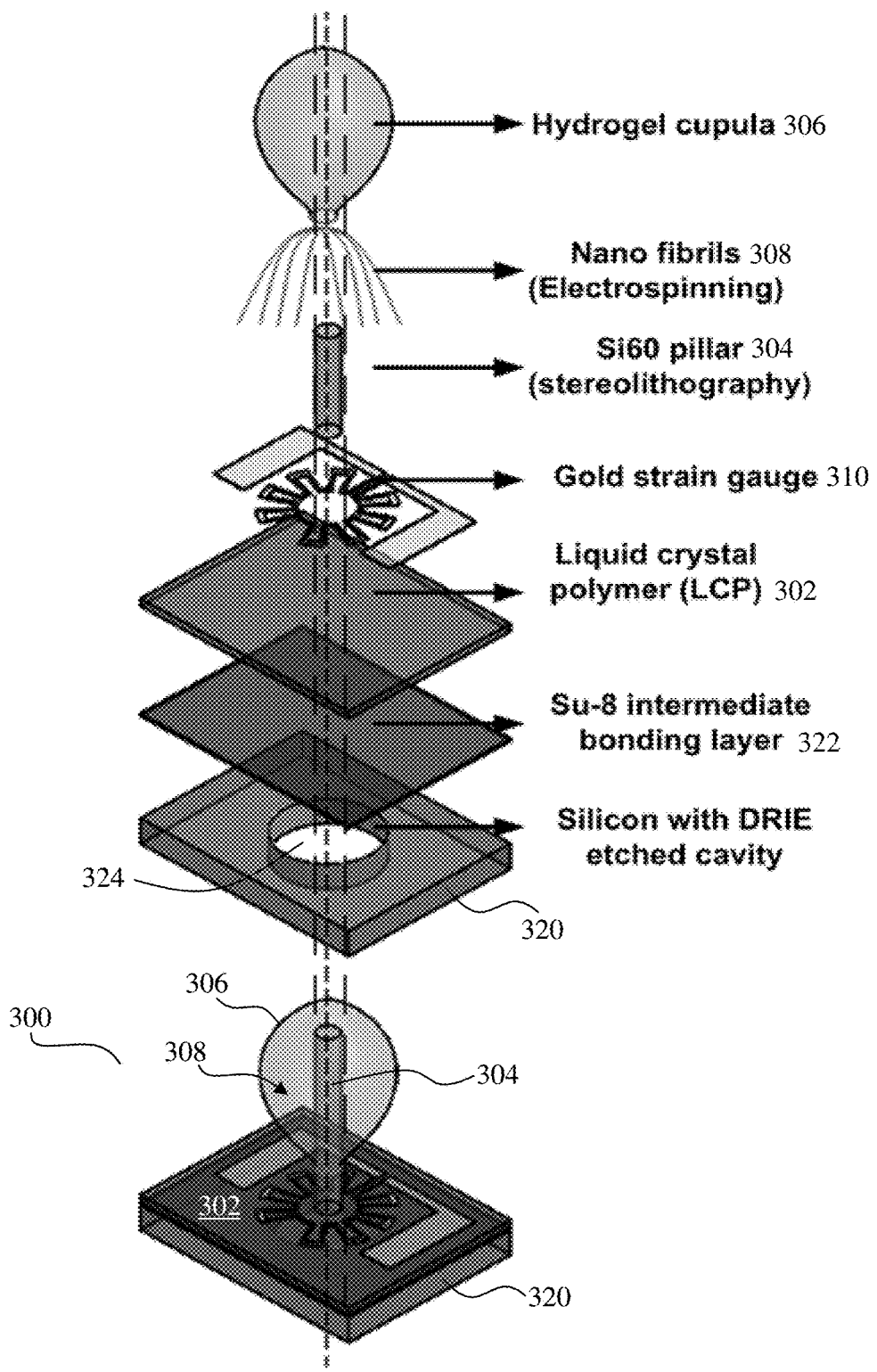
FIG. 3B shows an exploded view of the sensor of the embodiment of FIG. 3A.

FIG. 3A shows a perspective view of a sensor (e.g. a flow sensor) 300, according to various embodiments, illustrating the structure of the device 300 and the materials employed in the device fabrication. FIG. 3B shows an exploded view of the sensor 300 of the embodiment of FIG. 3A, showing a fabrication scheme illustrating the major steps involved in the sensor fabrication.

The structure of the flow sensor 300 includes a liquid crystal polymer (LCP) sensing membrane 302. The LCP membrane 302 may be a 25 µm thick circular LCP sensing membrane with a diameter of about 2000 µm. A strain gauge 310 may be deposited on a periphery of the membrane 302 and may be patterned into a serpentine shape. The strain gauge 310 may be a 150 nm thick gold (Au) strain gauge.

The design of the sensor 300 may include one or more radial strain gauges that may be placed at the periphery of the membrane 302 where maximum stress may be generated due to pressure on the membrane 302. As shown in FIG. 3A, a zig-zag or serpentine pattern of resistors in the form of long radial elements 312 and short tangential elements 314 connecting neighbouring radial elements 312 may be defined for the strain gauge 310. The strain gauge 310 may be electrically coupled to a pair of contact pads 316, 318. A non-limiting example of the design parameters of the LCP sensing membrane 302 and its characterization may be as described in [A. G. P. Kottapalli, C. W. Tan, M. Olfatnia, J. M. Miao, G. Barbastathis and M. Triantafyllou, "A liquid crystal polymer membrane MEMS sensor for flow rate and flow direction sensing applications," *J. Micromech. Microeng.*, vol. 21, p. 085006, 2011], the entire disclosure of which is incorporated herein by reference.

The LCP membrane 302 may be coupled or bonded to a carrier (e.g. a silicon carrier or wafer) 320 via an intermediate layer (e.g. an SU-8 layer) 322. A cavity or recess 324 may be defined in the carrier 320, for example by etching, below an area of the LCP membrane 302 at a position that at least substantially overlaps with the strain gauge 310.

An elongate microstructure (e.g. a polymer pillar) 304 mimicking a haircell may be mounted approximately at the center of the LCP membrane 302. As a non-limiting example, the polymer pillar 304 may be a Si60 haircell. In various embodiments, the dimensions (e.g., aspect ratio) of the haircell 304 fabricated may be larger than those of equivalent haircells in the cupula of a blind cave fish. In other words, the haircell 304 may be a high aspect ratio haircell. This increased haircell design may ensure that the sensor 300 has a good sensitivity to flow and also to ensure that the pillar 304 may extend beyond the stagnant boundary layer for all flow velocities that the sensor 300 may be employed for. In contrast, pillars of low aspect ratio may cause the sensitivity of a sensor to drop drastically and, in addition, low aspect ratio pillars may pose a challenge during a hair cell mounting process.

Biomimetic cupular fibrils or nanofibers 308 may be deposited in the shape of a pyramid connecting a distal end of the pillar 304 that extends into the flow towards a circumference of the sensor die. A hydrogel precursor solution may be drop-casted on top of the nanofibers 308 which act as a scaffold for the hydrogel precursor solution. The hydrogel precursor solution may then be processed to form a soft polymer cupula or hydrogel 306. The hydrogel 306 may at least substantially encapsulate the nanofibers 308 and may at least substantially surround a portion of the elongate microstructure 304. As a non-limiting example, the hydrogel 306 may be a Hyaluronic acid-methacrylic anhydride (HA-MA) hydrogel.

When the sensor 300 or a naked haircell sensor (without the cupula 306 and nanofibers 308) is introduced into a fluid flow, the haircell 304 may bend or be displaced in response to the drag force exerted by the fluid flow. Displacement of the haircell 304 may in turn cause a displacement of the LCP membrane 302. The buckling of the LCP membrane 302 may cause a change in a resistance of the strain gauge 310 which may then be read out as a voltage change, for example by means of an external Wheatstone bridge circuit that may be electrically coupled to the strain gauge 310.

Materials and device fabrication will now be described by way of the following non-limiting examples. Device fabrication mainly includes four major processing steps. The first step is to fabricate a LCP MEMS sensing membrane with gold strain gauges. The second step is to fabricate a haircell by stereolithography and to mount the haircell on the LCP membrane by precision X-Y-Z controlled motion. The third step is to form nanofibers on the haircell using an electrospinning process. The last step is to drop-cast a hydrogel precursor solution on the nanofiber scaffold, followed by photo-polymerization and wetting to initiate swelling to form a hydrogel. The fabrication process may be as illustrated in FIG. 3B.

The processing step relating to the LCP sensing membrane will now be described. This step commences with bonding a 25 µm thick LCP 3908 layer cut into the shape of a 4-inch diameter circle onto a 4 inch, 200 µm thick silicon wafer carrier via a 5 µm thick SU-8 2002 intermediate adhesive layer. Approximately 150 nm thick gold layer may then be deposited on the top side of the LCP layer with a 20 nm titanium or chromium adhesion layer. Serpentine shaped metal strain gauges may be patterned from the gold layer by a lift-off process on the top side of the LCP layer. Circular cavities may be etched into the silicon carrier aligned with the strain gauges on the top side by means of a deep reactive ion etching (DRIE) process. In various embodiments, gold (Au) metal may be employed for the strain gauge because it has more conformal deposition than other metals such as nickel (Ni), nickel-chromium (NiCr) or aluminium (Al), which allows electrical continuity across edges of the membrane. In addition, gold has a high gauge factor. Non-limiting examples of processing of the LCP sensing membrane will be described below with reference to FIGS. 4A and 4B.

Figure 4A:
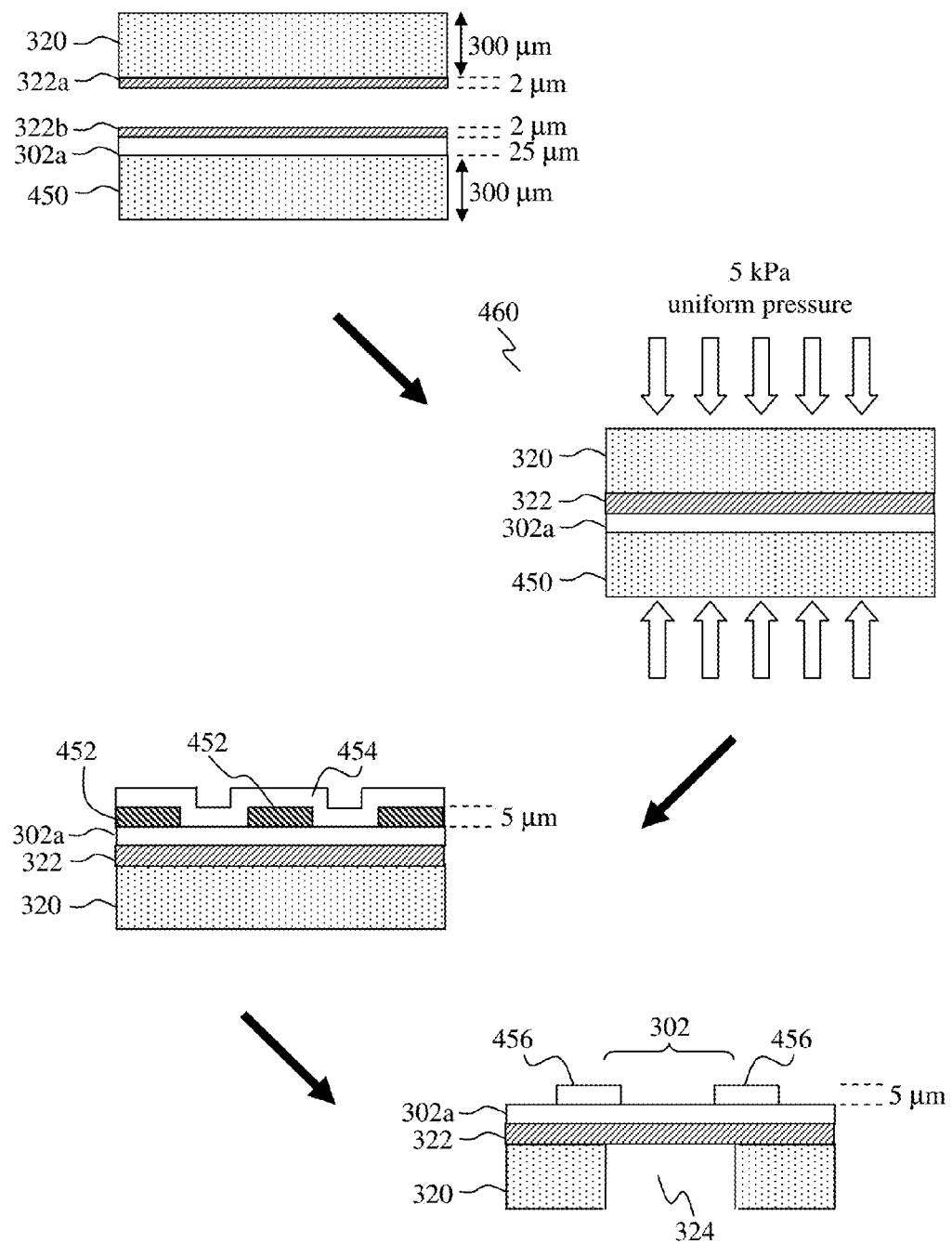
FIG. 4A shows, as cross-sectional views, various stages of a method for processing a liquid crystal polymer (LCP) membrane, according to various embodiments.

FIG. 4A shows, as cross-sectional views, various stages of a method for processing a liquid crystal polymer (LCP) membrane, according to various embodiments.

A thin film of LCP 3908 302a of thickness of about 25 µm may be employed. There may be approximately 18 µm thick copper cladding on both sides of the LCP thin film 302a, which may be etched away to expose fresh surfaces of the LCP thin film 302a. The fabrication process commences with bonding the 25 µm thick LCP 3908 film 302a to a 300 µm thick silicon (Si) wafer carrier 320 by using an intermediate adhesion layer of a 2 µm thick SU-8 2002 322a spin-coated on the silicon carrier 320 and a 2 µm thick SU-8 2002 322b spin-coated on the LCP film 302a. In order to be able to spin-coat SU-8 on a flexible film like LCP, the LCP film 302a may be temporarily bonded to a silicon (Si) support wafer 450. A film of about 5 µm thick photoresist (not shown) may be coated on the temporary support wafer 450 and the LCP film 302a may be bonded onto it.

The SU-8 coated faces of the silicon carrier 320 and the LCP layer 302a may then be exposed to oxygen plasma in a reactive ion etching (RIE) chamber for about 60 s to improve the bonding quality. Immediately after that, the SU-8 faces of both the LCP film 302a and the silicon carrier 320 may be brought into contact. The wafer pair may be subjected to a pre-optimized thermal cycle to harden the SU-8 intermediate adhesive layer (collectively represented as 322) and enhance the bond strength between the silicon carrier 320 and the LCP film 302a. The thermal cycle may include increasing the temperature in steps, starting at about 45° C. for about 20 min, then at about 90° C. for about 10 min, followed by a temperature of about 150° C. for about 50 min. The temperature may then be slowly ramped down to ambient temperature. A uniform pressure of 5 kPa may be applied throughout the bonding cycle on the wafer pair 460. The intermediate SU-8 layer bonding process may provide excellent bonding between the LCP and silicon carrier surfaces. The thin conformal layer 322 of SU-8 binds the LCP film 302*a* and the silicon carrier 320 together.

The silicon temporary support wafer 450 may then be removed by dipping in acetone which rapidly etches away the photoresist bonding the temporary support wafer 450 and the LCP film 302*a*, but does not attack SU-8.

Thereafter, a 5 μm photoresist (PR) 452 may be spin-coated on the LCP film 302*a* and patterned for a subsequent lift-off process. Chromium (Cr) and gold (Au) in the form of Cr (20 nm)/Au (100 nm) layer 454 may then be sputter-deposited. A thin intermediate layer of Cr may enhance the adhesion of Au on the LCP film 302*a*. A lift-off process may be performed to form gold piezoresistors 456, which may be part of a strain gauge. A DRIE through-hole 324, aligned with the resistors 456 on the LCP film 302*a* on the top side, may be etched through the silicon carrier 320 from the back side, which may therefore release the LCP membrane 302 defined from the LCP film 302*a*.

Figure 4B:
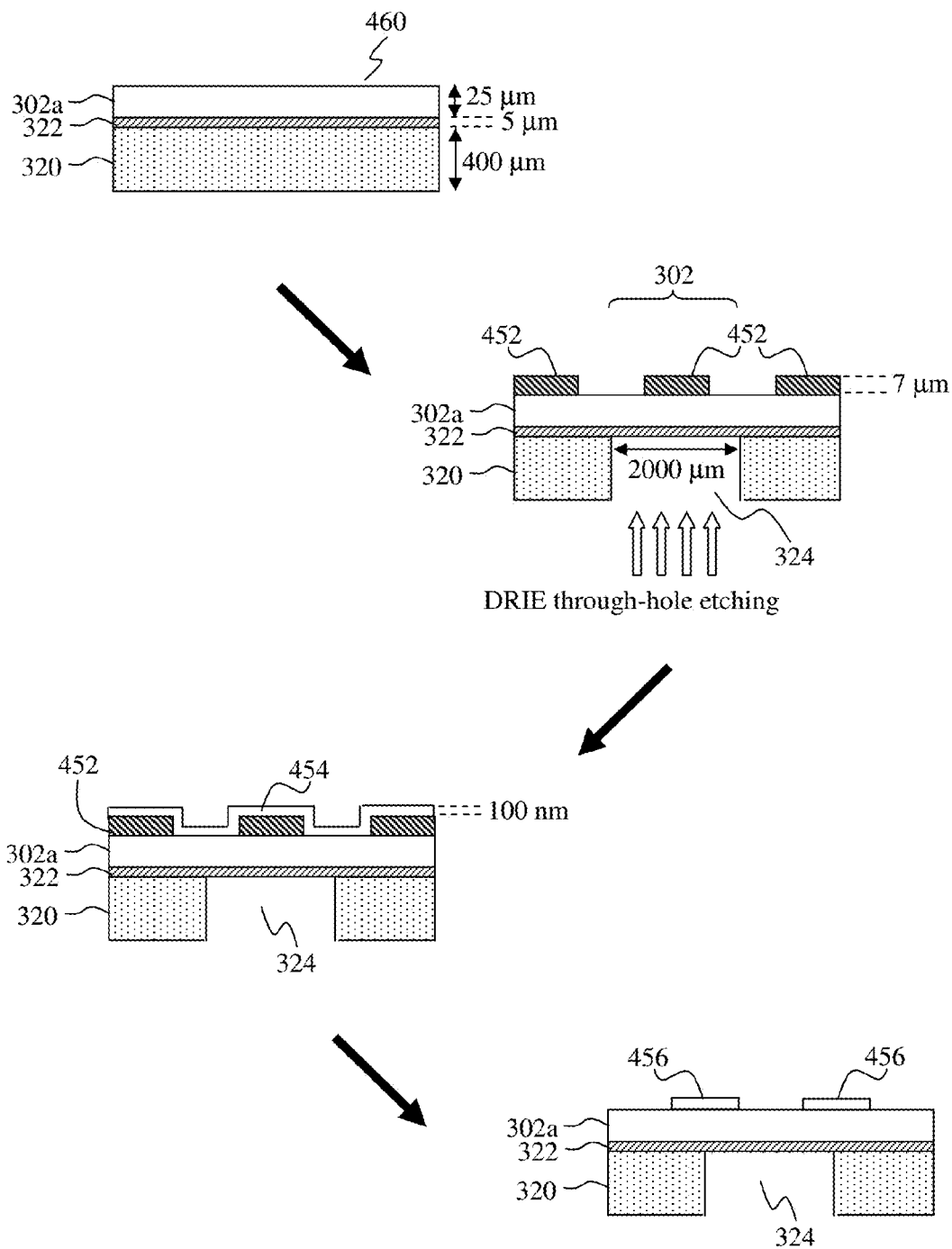
FIG. 4B shows, as cross-sectional views, various stages of a method for processing a liquid crystal polymer (LCP) membrane, according to various embodiments.

FIG. 4B shows, as cross-sectional views, various stages of a method for processing a liquid crystal polymer (LCP) membrane, according to various embodiments. The entire device fabrication process may involve very low temperatures of <130° C. As a result, the processing scheme may be realized on various substrate materials such as silicon (Si), glass and polymers such as LCP, Parylene, SU-8, etc.

A 25 μm thick LCP 3908 film 302*a* may be employed. There may be approximately 18 μm thick copper cladding on both sides of the LCP thin film 302*a*, which may be etched away completely, leaving fresh LCP surfaces of the film 302*a*.

The first step is LCP-silicon wafer bonding, for example bonded by using an SU-8 intermediate adhesion layer. While very good bonding may form between a silicon wafer and a LCP film by direct bonding using a wafer bonder, there may be a large stress between the wafers causing the wafer-pair to buckle after bonding. The buckling is a result of a large mismatch between the respective coefficients of thermal expansion of silicon (3.2 ppm° $C.^{-1}$) and LCP (18 ppm° $C.^{-1}$), causing the silicon wafer to break into pieces during the process of dicing. Therefore, an SU-8 intermediate layer may be used for bonding silicon to LCP, where the bonding process may be carried out at low temperatures on a hotplate.

Before spin coating SU-8, a silicon wafer carrier 320 may be cleaned in a piranha solution to avoid particle contamination and the wafer carrier 320 may then be dehydrated on a hotplate at about 130° C. for about 20 min to improve the adhesion of an SU-8 layer. SU-8 2005 may then be spin coated at about 2500 rpm for about 30 s on the silicon carrier 320 to form a 5 μm thick SU-8 layer 322. Then, a LCP film 302*a* cut into the shape of the silicon carrier 320 may be carefully placed on the silicon carrier 320, which is coated with the SU-8 layer 322. The silicon carrier 320 and the LCP film 302*a* may be pressed together by placing a uniform load, ensuring that no air bubbles are trapped at the interface. The wafer-pair 460 may then be heat treated to enhance the bond strength. The bonded wafer-pair 460 may be initially heated at lower temperatures for a longer time before ramping to higher temperatures to avoid heat generated stress and trapped air bubbles at the interface as the solvent in SU-8 of the layer 322 evaporates. During the heating process, a uniform pressure of about 5 kPa may be maintained by placing uniform circular metal wafers on the bonded wafer-pair 460. The wafer-pair 460 may be heat treated by increasing the temperature in steps starting at about 45° C. for about 20 min, then at about 80° C. for about 10 min, followed by a temperature at about 120° C. for about 20 min. During the heating process, the SU-8 layer 322 hardens and enhances the bond strength between the silicon carrier 320 and the LCP film 302*a*.

A DRIE hole 324 may then be etched on the other side of the silicon carrier 320 in order to release the LCP diaphragm or membrane 302 defined from the LCP film 302*a*. In order to protect the LCP film 302*a* during DRIE etching, a protection silicon wafer (not shown) spin-coated with a 7 μm resist may be bonded on the other side of the LCP film 302*a*, with the resist acting as an adhesive layer. The protection silicon wafer may then be easily removed by dipping in acetone for a few minutes after etching the DRIE hole 324. During this step, the LCP-silicon carrier bonding still remains intact because the SU-8 intermediate layer 322 is already hardened by heat treatment and is not attacked by acetone.

From the processing point of view, LCP membranes have an advantage of uniformity of thickness. Since the LCP membrane thickness may not be defined by any etching process, the thickness may be very uniform and does not involve any non-uniformity errors that may be caused by the etching process.

The next step includes forming one or more thin film resistors on the diaphragm surface. Gold (Au) may be employed for forming the resistor(s), which may be part of a strain gauge. A 5 μm or 7 μm thick resist 452 may be spin coated on the LCP film 302*a* for lift-off. A mask containing the serpentine resistor features may be aligned with the DRIE hole 324 using backside alignment. The resist 452 may be exposed and patterned. A 100 nm Au layer (with a 10 nm Cr layer to enhance Au adhesion) 454 may then be sputter deposited on the patterned resist 452. The next step is to lift off part of the Au layer 454 by etching the sacrificial resist layer 452 underneath. The wafer may be dipped in an acetone solution and ultrasonically agitated for about 20 s. Therefore, Au resistors 456 may be formed.

The processing step relating to micro-pillars as haircells, formed using a micro-stereolithography process, will now be described. Micro-stereolithography is a micro manufacturing process that may build three-dimensional (3D) micro structures, for example by generating a plastic part directly from a CAD (computer-aided design) program or computer model. Micro-stereolithography may enable building of a micro component by solidifying a liquid monomer on a layer by layer fashion. As compared to an SU-8 or a LIGA (German acronym that stands for Lithographie, Galvanik and Abformung, or equivalently Lithography, Electroplating, and Molding) process, the micro-stereolithographic process may build sophisticated 3D microstructures with great ease and in a much lower fabrication time.

The micro-pillar haircells 304 may be fabricated from a Si60 polymer material on a built-in high resolution stereolithography (SLA) machine. Initially, a 3D model of the haircell 304 may be created with the required dimensions according to the device design. The designed 3D model may then be sliced into a series of two-dimensional (2D) layers of equal thicknesses which may be executed to control an X-Y stage containing a UV (ultraviolet) curable Si60 solution. High-aspect micro-pillars 304 may be formed by scanning a 355 nm UV beam having a spot size of about 0.01 mm on a liquid monomer Si60 resin, curing the resin into a solid polymer structure layer by layer, and stacking all the layers together.

Figure 5:
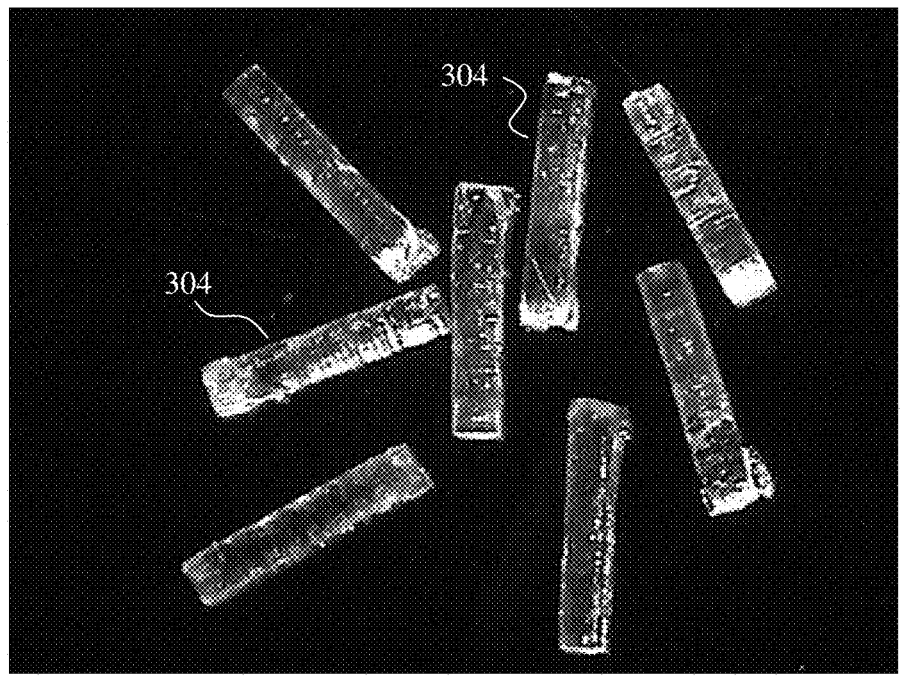
FIG. 5 shows a three-dimensional optical microscope image of Si60 haircells fabricated by a stereolithography process.

One or more cylindrical haircells 304 with a circular cross-section of a diameter of about 400 μm and a height of about 2500 μm may be fabricated. FIG. 5 shows a three-dimensional optical microscope image 500 of the Si60 haircells (two of which indicated as 304) fabricated by the stereolithography process. The Young's modulus of the Si60 haircells 304 is determined to be about 2.5-3 GPa through experimental analysis carried out using a nano-indentation technique.

A fabricated haircell 304 may then be mounted at the center of an LCP membrane 302 using a precise X-Y-Z controlled translation stage. A micro-drop of EPO-TEK-H70E non-conducting epoxy is carefully positioned at the center of the membrane 302 using a micropipette under a microscope. The pillar 304, held at one end with a micro-tip tweezer may then be carefully mounted on the drop of epoxy. As the pillar 304 is moved approaching the membrane 302, the positioning of the pillar 304 may be observed through a high-speed camera. By repeating the process several times, the optimum quantity of epoxy required to ensure good strength of the pillar-LCP root connection while avoiding any epoxy scumming at the circumference of the pillar root may be determined. The structure may then be heat-treated for about 12 hours at about 55° C. to ensure that the epoxy is completely cured to form a strong contact between the haircell 304 and the LCP membrane 302.

Figure 6A:
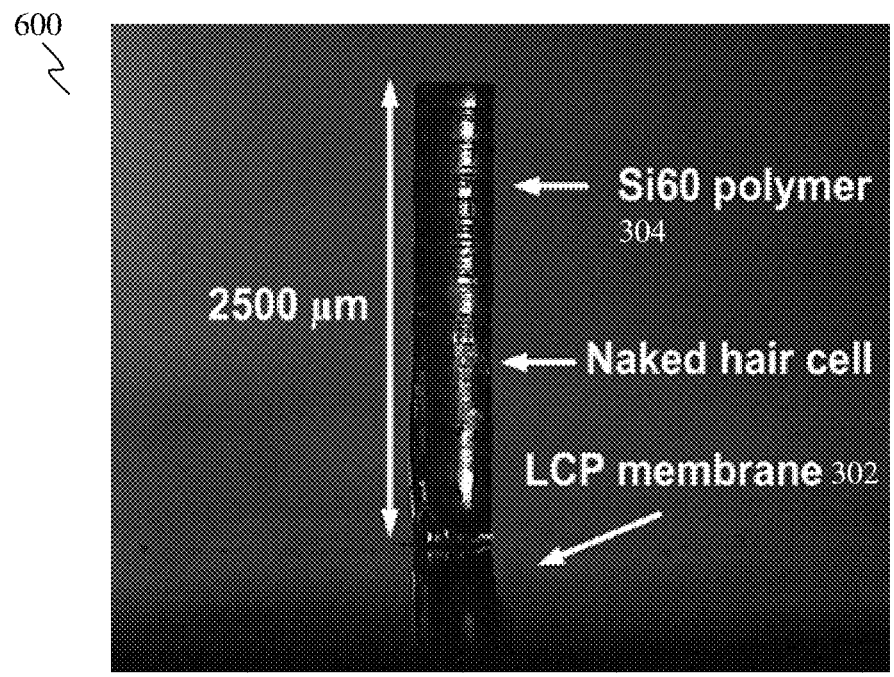
FIG. 6A shows an optical microscope image of a 90° angle view of a haircell mounted on a liquid crystal polymer (LCP) membrane.
Figure 6B:
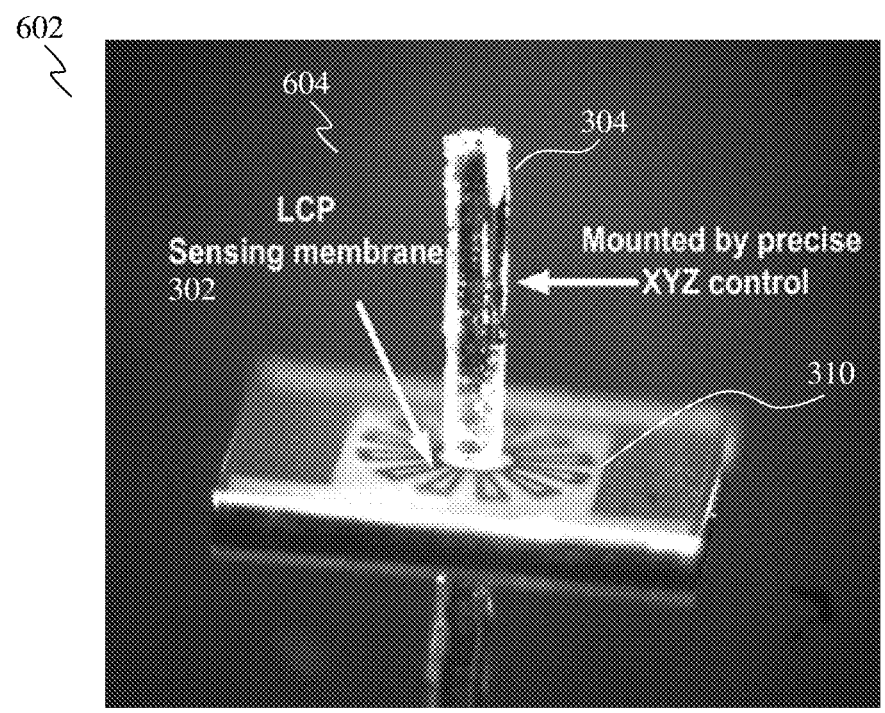
FIG. 6B shows a photograph of a naked haircell sensor with a Si60 pillar mounted at the center of a liquid crystal polymer (LCP) membrane.

FIG. 6A shows an optical microscope image 600, taken using a 3D microscope, of a 90° angle view of a haircell 304 mounted on a liquid crystal polymer (LCP) membrane 302, illustrating the dimensions of the pillar 304. FIG. 6B shows a photograph 602 of a naked haircell sensor 604 with a Si60 pillar 304 mounted at the center of a liquid crystal polymer (LCP) membrane 302, taken with a high-speed camera. Also shown in FIG. 6B is a strain gauge 310. The haircell 304 shown in FIGS. 6A and 6B may have a height of about 2500 μm.

The processing step relating to nanofibers, formed using an electrospinning process, will now be described. Biomimetic cupular fibrils may be formed by an electrospinning process generating nanofibers by electrostatically ejecting a polymer solution from a capillary tube under an applied electric field. In various embodiments, a solution of PolyL-lactide/ε-caprolactone (PLC): acetone in a 1:6 ratio may be used to form the fibers.

Figure 7:
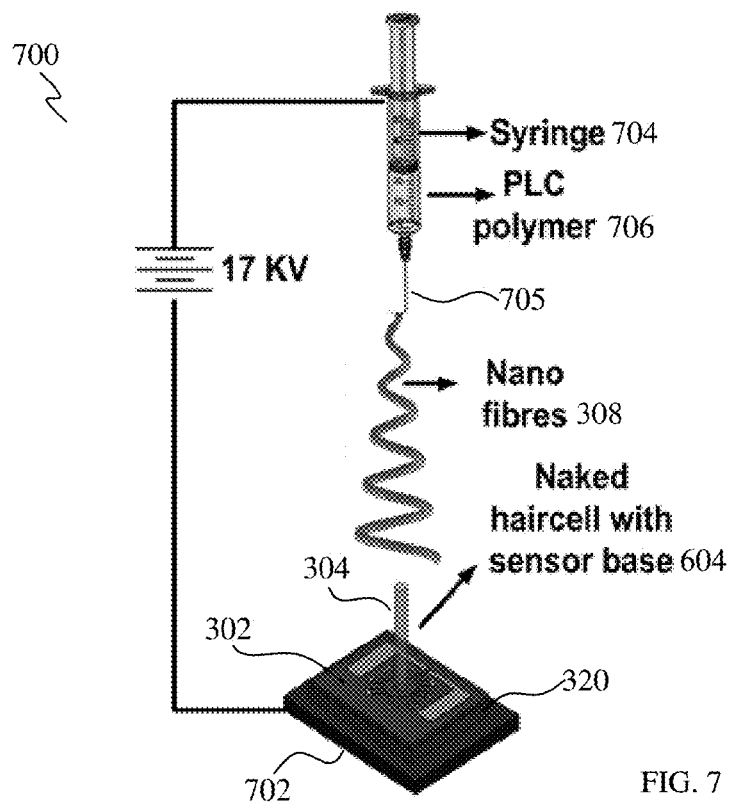
FIG. 7 shows an electrospinning set-up used to form nanofibrils, according to various embodiments.

FIG. 7 shows an electrospinning set-up 700 used to form nanofibrils, according to various embodiments, illustrating the spinning process. A naked haircell sensor 604 may be placed on a plate 702. A syringe 704 containing a PLC polymer solution 706 may be positioned above and spaced apart from the naked haircell sensor 604. A high voltage of about 17 kV may be applied between the syringe 704 and the plate 702, creating an electric field that may eject a thin fiber 308 of PLC from the PLC polymer solution 706 from the syringe needle 705 of about 0.5 mm diameter, where the PLC fiber may be deposited on the haircell 304 that may be placed approximately 15 cm away.

Figure 8A:
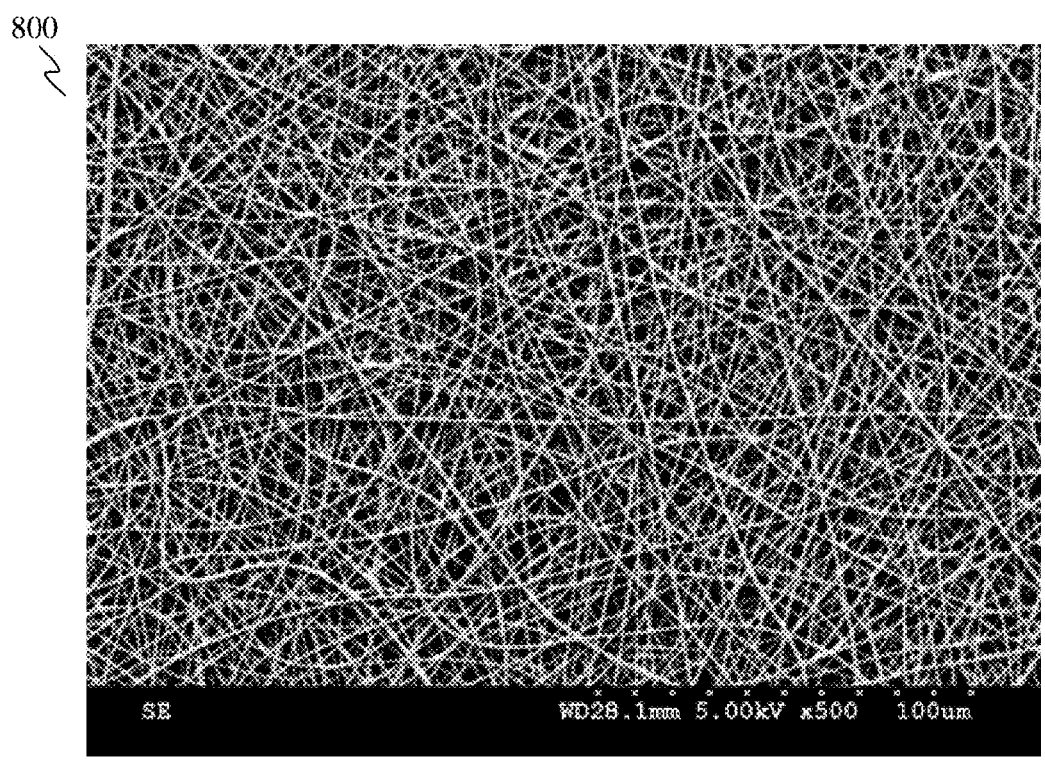
FIGS. 8A to 8C show scanning electron microscope (SEM) images of fibers deposited on a flat aluminium foil during a nanofiber electrospinning optimisation process.
Figure 8B:
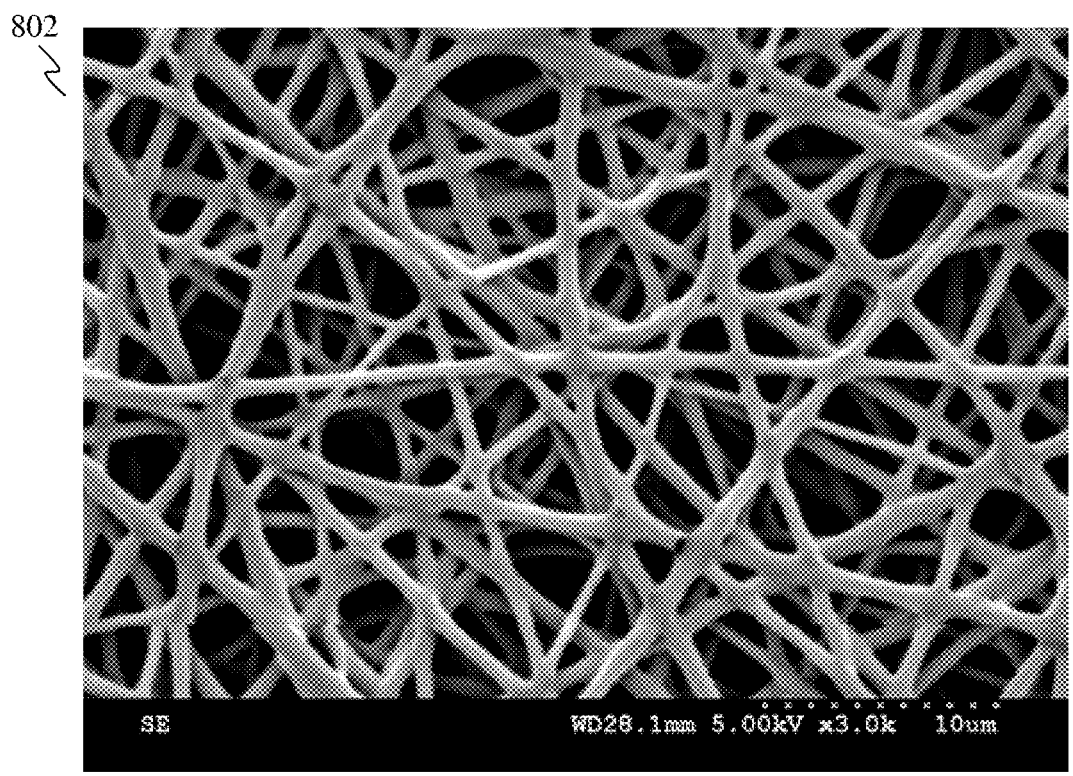
Figure 8C:
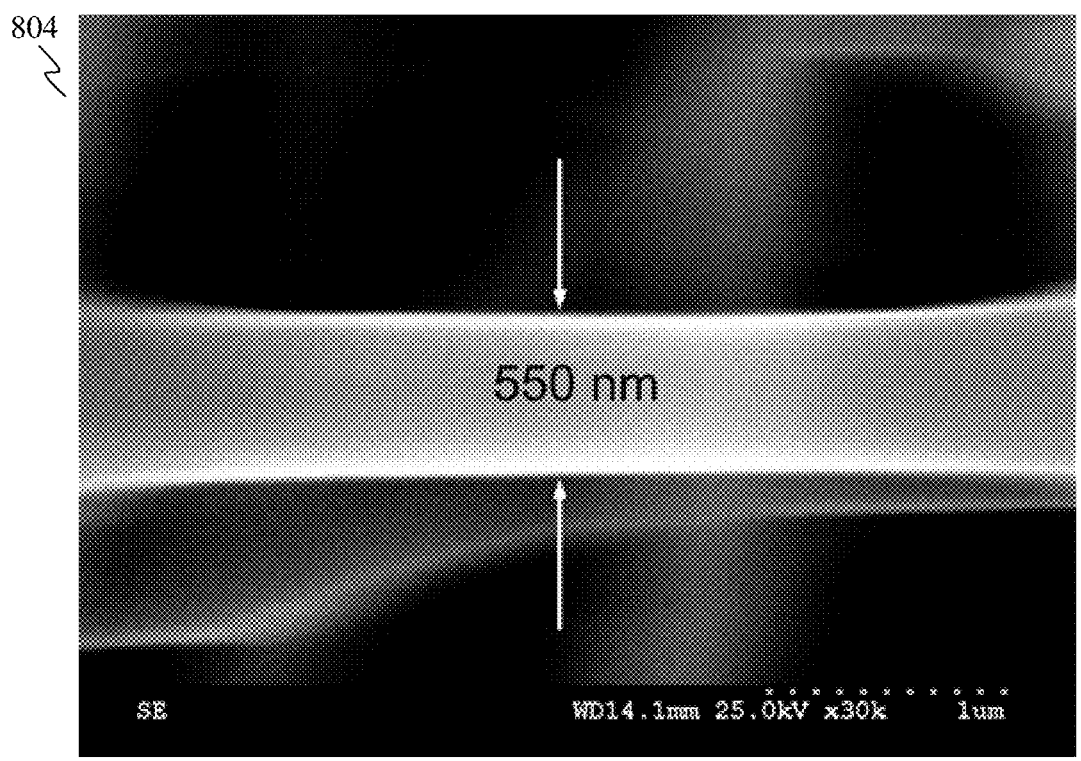

Initially, before depositing the fibers 308 on the haircell 304, the fiber diameter may be optimized by varying the process parameters (e.g. voltage, etc.), each time. FIG. 8A shows a scanning electron microscope (SEM) image 800 of PLC fibers deposited on a flat aluminium (Al) foil during a nanofiber electrospinning optimisation process. FIG. 8B shows a SEM image 802 of a zoom-in view showing the nanofibers in greater details. FIG. 8C shows a SEM image 804 of a further zoom-in view showing a single nanofiber of a diameter of about 500-600 nm.

Figure 9A:
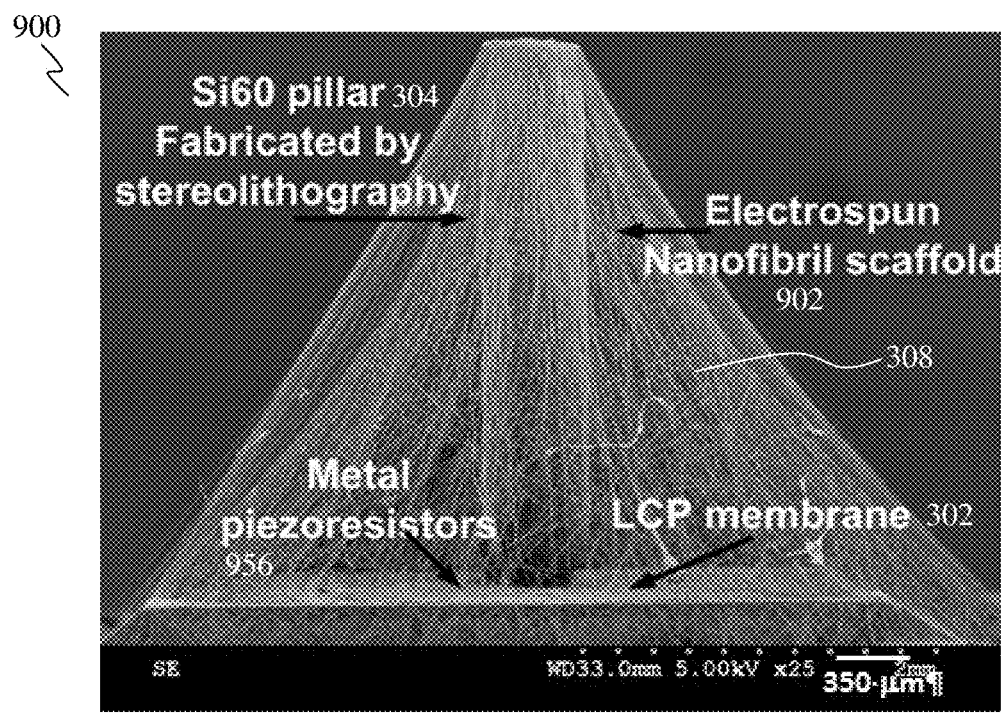
FIG. 9A shows a scanning electron microscope (SEM) image of a side view of a device after nanofiber electro spinning.
Figure 9B:
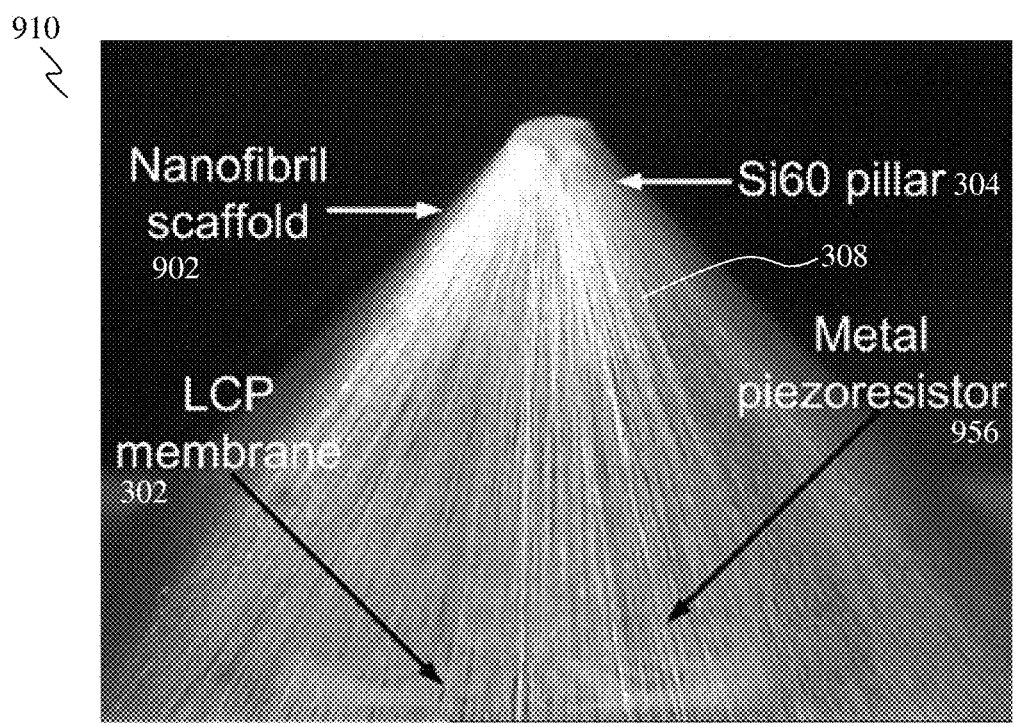
FIG. 9B shows an optical microscope image of an angle view of a device after nanofiber electrospinning.

FIGS. 9A and 9B show microscopy images illustrating the formation of the biomimetic nanofibrils on the device. FIG. 9A shows a scanning electron microscope (SEM) image 900 of a side view of a device showing the LCP membrane 302 with metal piezoresistors 956 of a strain gauge and a Si60 pillar 304 covered with nanofibers 308. These fibers 308 may act as a scaffold 902 during the hydrogel drop-casting process to be subsequently carried out. As shown in FIG. 9A, the scaffold 902 of nanofibrils 308 formed on the haircell 304 may be of a pyramidal shape. FIG. 9B shows an optical microscope image 910 of an angle view of the device, illustrating the uniformity of the pyramid-shaped nanofibril formation on the device. As shown in FIGS. 9A and 9B, uniform fibers 308 of a diameter of about 500 nm to about 550 nm may be formed from the distal tip of the haircell 304 to the base. The high-aspect pillar 304 may prevent the fibers 308 from being deposited on the LCP membrane 302. In other words, the fibers 308 may be deposited in a pyramid shape with uniform fibers from the distal tip of the haircell 304 to the perimeter of the device.

The processing step relating to a soft polymer cupula, formed by hydrogel drop-casting, will now be described. In this process, the haircell 304 and the nanofibers 308 may be encapsulated into a viscous hydrogel capsule (cupula). The cupula may enhance the flow sensing capabilities in many ways. For example, it may increase the overall surface area exposed to a flow past the haircell 304, thereby increasing the sensitivity of the sensor due to an increased drag force. The hydrogel material may enhance the signal absorption due to the enhanced friction factor associated with the material. Moreover, the presence of the hydrogel may increase the effective height of the haircell 304 allowing the overall haircell height to reach much beyond the stagnant boundary layer, thereby further enhancing the sensitivity of the sensor.

As a non-limiting example, Hyaluronic acid-methacrylic anhydride (HA-MA) hydrogel ($10^6$ Da) of approximately 1% concentration with approximately 0.1% I 2959 initiator may be used for the drop-casting process. A syringe with a 0.1 mm diameter needle containing a hydrogel precursor solution for forming the hydrogel may be fixed to a three-axis micropositioner. Several drops of HA-MA may be precisely dropped on a haircell 304 of a sensor. The HA-MA may creep or flow down over the nanofibers 308 due to gravity. The nanofibrils 308 mimic the cupular-fibrils in the biological neuromast, and in terms of the device, the nanofibrils 308 may render mechanical strength to the soft hydrogel material. In addition, the nanofibrils 308 may function as a scaffolding structure, supporting the viscous hydrogel material during the drop-casting process.

Figure 10:
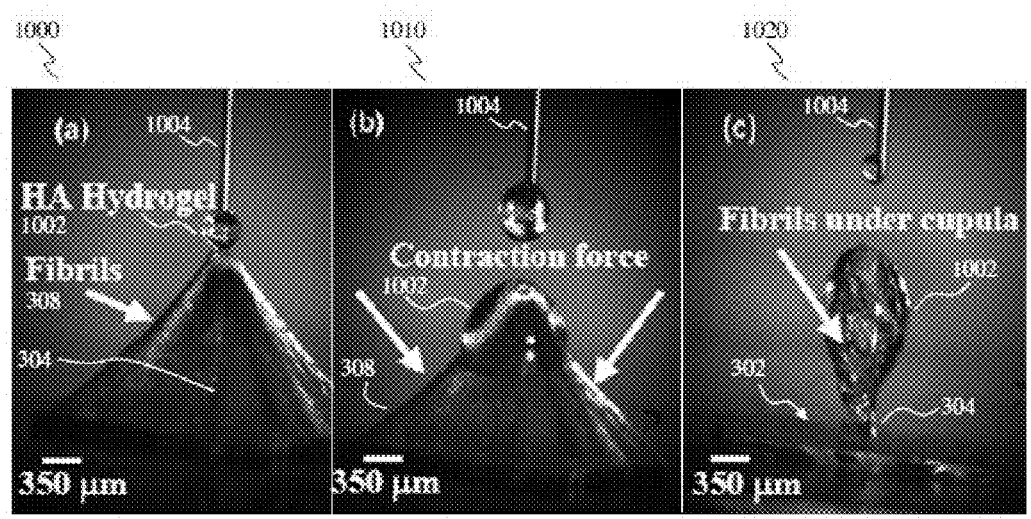
FIG. 10 shows high speed camera images during drop-casting of a hydrogel material.

FIG. 10 shows high speed camera images during drop-casting of a hydrogel material. The artificial cupula may be fabricated, as shown by the image 1000 of FIG. 10, by drop-casting HA-MA hydrogel micro-drops 1002 through a needle 1004 that is precisely positioned on top of a pillar or haircell 304. As shown in the image 1010 of FIG. 10, the hydrogel micro-drop 1002 may contract and encapsulate the nanofibrils (nanofibers) 308 as it creeps down the pillar 304 due to gravity. Image 1020 of FIG. 10 shows an image of the hydrogel material at least substantially encapsulating the nanofibrils 308. The fibrils 308 may ensure conformal cupula coverage on the haircell 304 and may prevent the hydrogel material from reaching the LCP sensing base or membrane 302.

Figure 11:
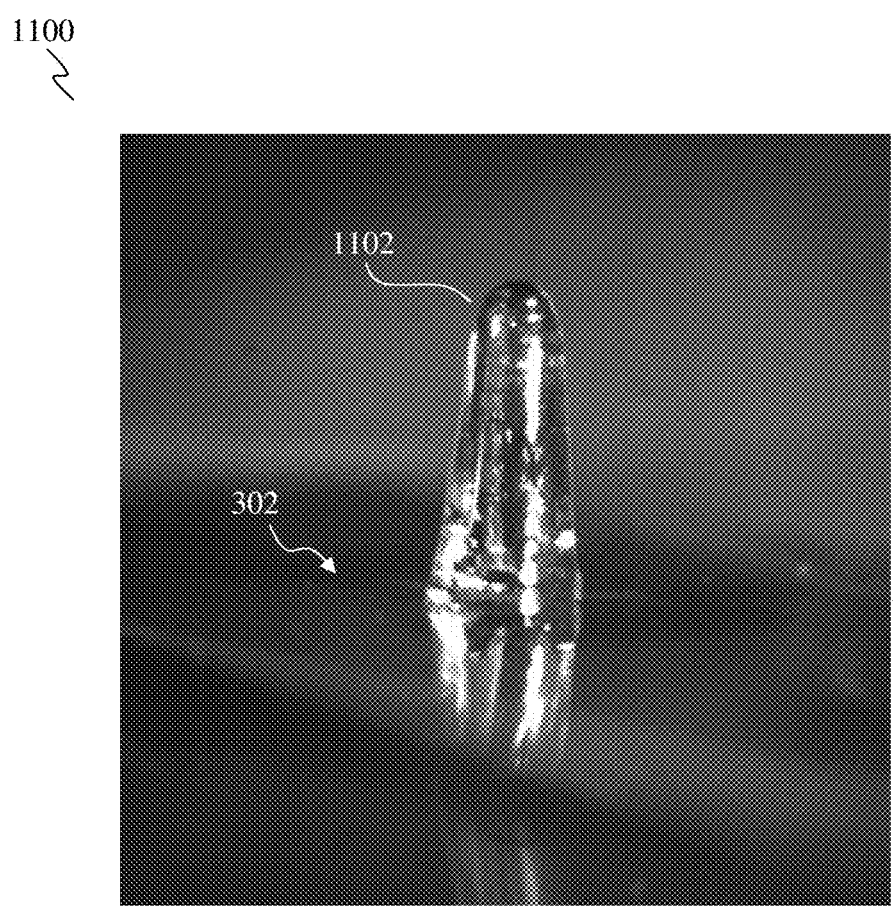
FIG. 11 shows a three-dimensional microscope image of a biomimetic cupula sensor fabricated without employing nanofibrils during the drop-casting process.

FIG. 11 shows a three-dimensional microscope image 1100 of a biomimetic cupula sensor fabricated without employing nanofibrils (i.e. no nanofibril scaffold) during the drop-casting process. The hydrogel material 1102 may reach the LCP membrane 302 due to gravity and may effectively add weight onto the membrane 302 and may locally change (increase) the thickness of the membrane 302.

UV-photopolymerization of the hydrogel cupula 1002 may be performed by exposing the devices for about 5 minutes to UV light to initiate cross-linking in the hydrogel material 1002. The sensors may be placed in water for about 24 hours to initiate swelling and further increase the surface area of the cupula.

Figure 12A:
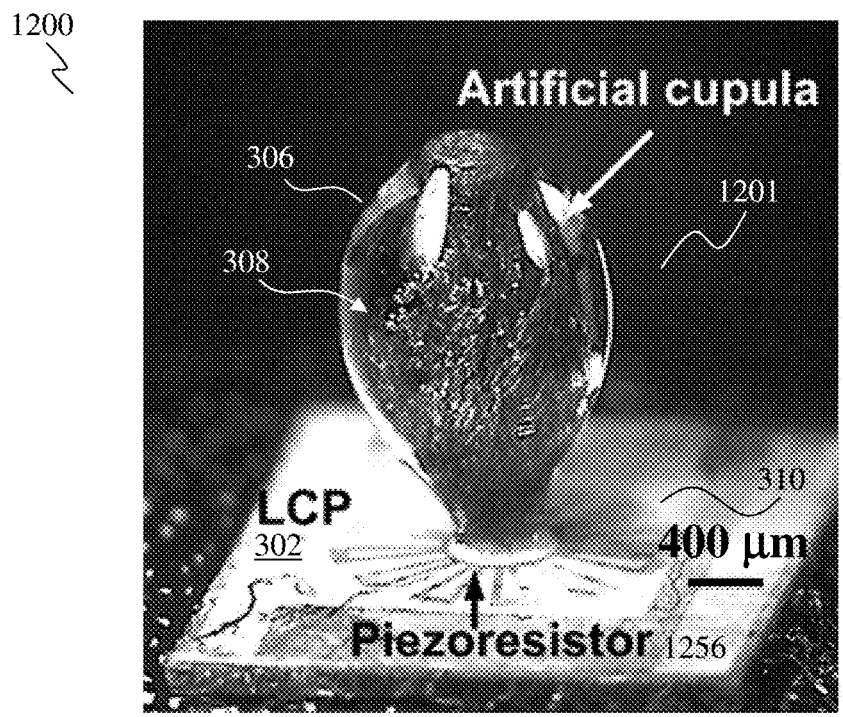
FIGS. 12A and 12B show microscope images of a sensor after a photo-polymerization and swelling process.
Figure 12B:
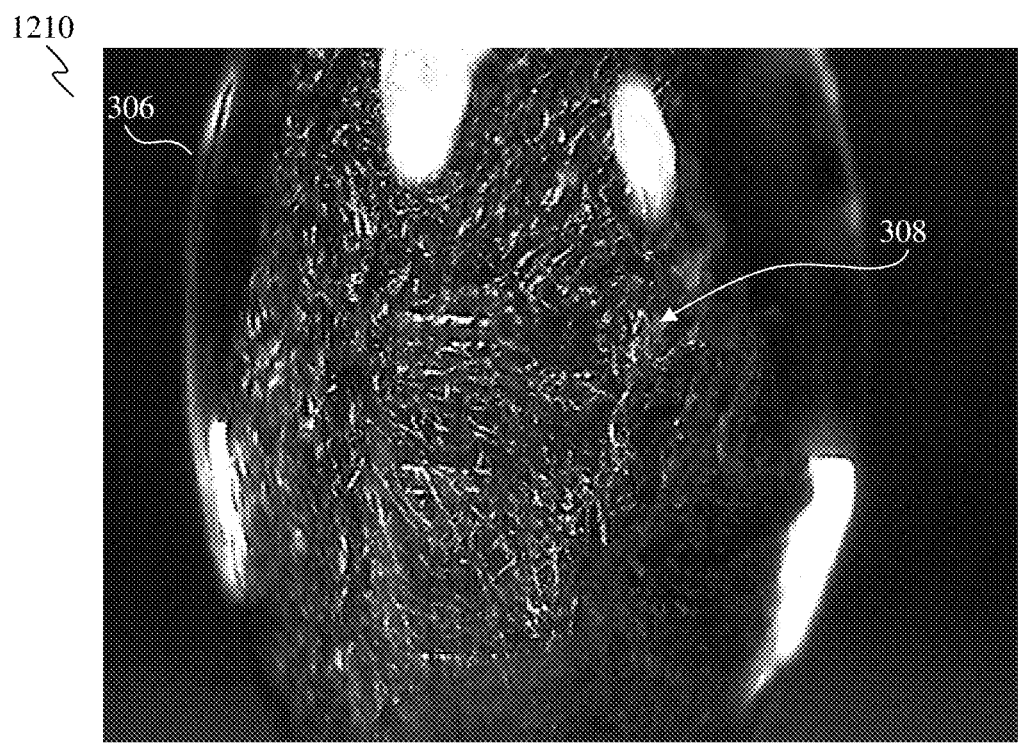

FIGS. 12A and 12B show microscopic images of a hydrogel cupula MEMS sensor fabricated using a pyramid-shaped nanofibril structure as a scaffolding structure, when the drop-casting and swelling process is complete. FIG. 12A shows a microscope image 1200 of a sensor 1201 after the photo-polymerization and swelling process. As may be observed, a hydrogel 306 is formed, where the nanofibers 308 may be completely encapsulated inside the hydrogel 306. As shown in FIG. 12A, the hydrogel 306 does not drop onto the LCP membrane 302. Also shown in FIG. 12A is a piezoresistor 1256 of a strain gauge 310. FIG. 12B shows a microscope image 1210 of a zoom-in view of the sensor 1201, showing the encapsulated nanofibers 308 within the hydrogel 306.

Results relating to the sensors of various embodiments will now be described. The sensors are tested for flow sensing at two stages of the sensor development, on the naked haircell sensors (before forming the cupula) (e.g. sensor 604, FIG. 6B) and on the complete biomimetic cupula sensor (after forming the hydrogel cupula 306) 300, 1201. The sensors are tested for both air and water flow velocity sensing in a wind tunnel and a water tunnel respectively. The output of the respective sensors may be connected to an external Wheatstone bridge circuit that may convert a resistance change of the sensor into a voltage change. No amplification or signal processing is used in collecting the sensor output. The outputs may be acquired using a data acquisition card and recorded using a software. The naked haircell sensors may demonstrate ultra-high sensitivities of approximately $0.4$ mV/ms$^{-1}$-$1.4$ mV/ms$^{-1}$ (e.g. about $0.9$ mV/ms$^{-1}$) and approximately $0.015$ V/ms$^{-1}$-$0.03$ V/ms$^{-1}$ (e.g. about $0.022$ V/ms$^{-1}$) for air and water flow sensing respectively. Addition of the biomimetic cupula may further enhance the sensitivity of the sensors by about 3-5.5 (e.g. about 5) times for air flow and about 2-4 (e.g. about 3.5) times for water flow respectively.

As described above, various embodiments provide for development of a soft polymer based MEMS sensor from inspiration gained from biological neuromast sensors present on/inside the body of the blind cave characin fish. The design fundamentally employs very similar structural features as for the biological neuromasts, and benefits from utilizing such biomimetic design in an artificial flow sensor to provide enhanced sensitivity and high resolution for flow sensing applications. Fabrication techniques as described herein may be employed in developing the device or sensor. The devices developed may be of low-cost, light weight and may be easy to fabricate.

Although in the past a few researchers have focused their attention towards developing artificial sensors mimicking the superficial neuromast sensor of the fish, a complete biomimetic device involving the cupular fibrils that is capable of real-time flow sensing was not developed. For example, prior art ultra-sensitive MEMS haircell sensors that are capable of flow sensing achieved sensitivities of about $0.24$ mV/ms$^{-1}$ and $0.01$ V/ms$^{-1}$ for air and water flow velocity sensing respectively using naked haircell sensors. In contrast, the naked haircell sensors developed in this work may demonstrate sensitivities of approximately $0.9$ mV/ms$^{-1}$ (~4 times higher) and approximately $0.022$ V/ms$^{-1}$ (~2.2 times higher) for air and water flow sensing respectively.

Various embodiments also provide for the development of biomimetic nanofibrils encapsulated into a hydrogel cupula. Although the neuromasts in the blind cave fish possess fibers embedded within the cupula, the biomimetic MEMS device developed in the past did not incorporate these fibers in the artificial cupula. As described herein, in an artificial device, these nanofibrils (similar to the cupular fibrils encapsulated in a cupula), may act as structural support networks for the cupula, allowing various advantages. The cupular fibrils or nanofibers may help in enhancing the aspect ratio of the haircell, allowing the haircell to extend into the surrounding flow further beyond the boundary layer, thereby making the device or sensor highly sensitive. These fibers may enhance the coupling of the haircell (e.g. Si60 haircell) to the cupula (hydrogel). The fibers may offer additional mechanical strength to the soft cupula to withstand high velocity flows in water.

During device fabrication, the pyramid-shaped structure of the nanofibrils may act as a scaffold for the hydrogel drop-casting process. These fibrils may prevent the gel from dropping onto the membrane, which may effectively add weight and increase the thickness of the membrane, which may cause a reduction in the sensitivity of the device. This may affect the initial device calibration conducted on the LCP membrane prior to forming any haircell on the membrane.

The biomimetic cupula (without encapsulated fibers) developed in the past had only been tested to a maximum flow velocity of $350$ mms$^{-1}$, as compared to a much higher flow velocity of about $500$ mms$^{-1}$ conducted for the sensors of various embodiments. The artificial cupula sensors of various embodiments were tested to withstand a water flow velocity as high as about $650$ mms$^{-1}$. The addition of the artificial cupula on the naked haircells show a drastic increase in the sensitivity by about 5 times for air flow sensing and about 3.5 times for water flow sensing. Addition of the biomimetic cupula may also reduce random fluctuations in the sensor output, thereby increasing the accuracy of flow sensing. The sensors of various embodiments may detect air flow as low as approximately $0.01$ ms$^{-1}$.

The sensing membrane of various embodiments uses a polymer material called liquid crystal polymer (LCP), which offers various advantages over silicon (Si) that is a commonly used structural material for fabricating MEMS sensors. Using silicon as a structural material for flow sensing presents some fundamental limitations. Silicon material has a lower mechanical yield strain and hence is not robust to large fluctuations in the flow, causing sudden impact on the microstructure. In various embodiments, LCP is used as a structural material of the sensor. The LCP material may offer a much higher sensitivity over silicon as a structural material for flow sensing due to its much lower Young's modulus, without compromising too much on the response of the sensor. Therefore, more reliable, robust (due to higher fracture limit) and highly sensitive (due to low Young's modulus) pressure sensors or flow sensors may be developed at low fabrication costs employing LCP as the structural material, over silicon. Comparing a silicon membrane sensor and a LCP membrane pressure sensor with the same membrane dimensions and thickness, the LCP sensor may be more sensitive than the silicon membrane sensor. Further, LCP has a very low moisture absorption capability and is highly resistant to chemicals, which make the sensor robust for applications in harsh environments, e.g. atmospheric wind and water flow monitoring purposes.

The Si60 polymer haircells fabricated by stereolithography may offer an advantage of achieving much higher aspect ratios than that is possible by SU-8 fabrication. Stereolithography offers the flexibility of polymer material choice that may be used for the haircell fabrication. Moreover, the fabrication process may be much simpler as compared to processing thick layers of SU-8 and performing optical lithography.

The selection of materials for the sensor fabrication is done taking into consideration the water condition(s) in which the sensors may be operable in. As non-limiting examples, liquid crystal polymer (LCP), as a sensing membrane, and a polycarbonate Si60 pillar may be employed for fabrication of the sensors. These materials may have a high hermeticity and may be suitable for underwater applications. In contrast, silicon (Si) is not an ideal material for underwater sensing applications, for example due to its lower mechanical yield strain. Moreover, using LCP may enhance the sensitivity of the sensor as compared to a silicon material.

The sensors of various embodiments may cater to the flow sensing industry. Flow sensors are essential for a wide range of diverse fields such as, but not limited to, environmental air flow sensing, water flow sensing in massive water bodies, pipe lines, drinking water flow monitoring, water consumption monitoring at individual units, gas flow monitoring from very small chemical gas pipes used in laboratory machines to huge pipe lines transferring large volumes of gas. The technology developed for the sensors of various embodiments may also be of interest to areas that need sensing on underwater or surface water marine vehicles. Arrays of these sensors may be used on the surfaces of autonomous underwater vehicles (AUVs) to detect flows around the body of the vehicles, which may enable an energy-efficient maneuvering of the vehicles. Moreover, the sensors may also detect objects around the vehicle and generate an artificial vision for the vehicle.

Various modifications may be made to the sensors. Miniaturization of the dimensions of the entire device to much smaller scales may be carried out. For example, the device size may be reduced to approximately 2 mm×2 mm. Further, circuitry external to the sensor may be added, to perform noise filtering, signal amplification and post-processing to make the sensor more user friendly for commercial flow sensing applications.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A sensor for determining a flow parameter of a fluid, the sensor comprising:
   a polymer membrane;
   an elongate microstructure extending at least substantially perpendicularly from a surface of the polymer membrane; and
   a strain gauge formed on the polymer membrane;
   wherein the elongate microstructure is arranged to cause a displacement of the polymer membrane in response to a fluid flowing and interacting with the sensor, and
   wherein the strain gauge is configured to provide a measurement indicative of a flow parameter of the fluid based on the displacement of the polymer membrane.

2. The sensor as claimed in claim 1, wherein the strain gauge is formed on the surface of the polymer membrane.

3. The sensor as claimed in claim 1, wherein the strain gauge comprises a serpentine shape and is arranged at least substantially surrounding the elongate microstructure.

4. The sensor as claimed in claim 3, wherein the serpentine shape is defined by a plurality of first elements extending radially from the elongate microstructure, and a plurality of second elements arranged circumferentially around the elongate microstructure,
   wherein each respective second element of the plurality of second elements is arranged in between respective adjacent first elements of the plurality of first elements and connects the respective adjacent first elements.

5. The sensor as claimed in claim 4, wherein each first element has a radial length that is larger than a circumferential length of each second element.

6. The sensor as claimed in claim 4, wherein each first element has a width that is smaller than a width of each second element.

7. The sensor as claimed in claim 1, wherein the elongate microstructure has a length of between about 2500 μm and about 4000 μm.

8. The sensor as claimed in claim 1, wherein the elongate microstructure has an aspect ratio of between about 6 and about 10.

9. The sensor as claimed in claim 1, wherein the elongate microstructure comprises a stereolithographically defined elongate microstructure.

10. The sensor as claimed in claim 1, wherein the elongate microstructure comprises a polymer.

11. The sensor as claimed in claim 1, wherein the elongate microstructure has a cylindrical structure.

12. The sensor as claimed in claim 1, wherein the polymer membrane comprises a liquid crystal polymer.

13. The sensor as claimed in claim 12, wherein the liquid crystal polymer has a circular shape.

14. The sensor as claimed in claim 1, further comprising a hydrogel coupled to at least a portion of the elongate microstructure, the portion being an end of the elongate microstructure distal to the polymer membrane.

15. The sensor as claimed in claim 14, further comprising a plurality of nanofibers at least substantially encapsulated by the hydrogel.

16. The sensor as claimed in claim 15, wherein each nanofiber has a diameter of between about 500 nm and about 1000 nm.

17. A method for forming a sensor for determining a flow parameter of a fluid, the method comprising:
   providing a polymer membrane;
   forming an elongate microstructure extending at least substantially perpendicularly from a surface of the polymer membrane;
   forming a strain gauge on the polymer membrane;
   wherein the elongate microstructure is arranged to cause a displacement of the polymer membrane in response to a fluid flowing and interacting with the sensor, and
   wherein the strain gauge is configured to provide a measurement indicative of a flow parameter of the fluid based on the displacement of the polymer membrane.

18. The method as claimed in claim 17, wherein forming an elongate microstructure comprises stereolithographically defining the elongate microstructure.

19. The method as claimed in claim 17, further comprising forming a hydrogel coupled to at least a portion of the elongate microstructure, the portion being an end of the elongate microstructure distal to the polymer membrane.

20. The method as claimed in claim 19, further comprises forming a plurality of nanofibers,
   wherein forming a hydrogel comprises forming the hydrogel at least substantially encapsulating the plurality of nanofibers.

* * * * *